(12) United States Patent
Chuang et al.

(10) Patent No.: US 12,283,851 B2
(45) Date of Patent: Apr. 22, 2025

(54) HAIRPIN WIRE MOTOR STATOR

(71) Applicant: DELTA ELECTRONICS, INC., Taoyuan (TW)

(72) Inventors: Yu-Wei Chuang, Taoyuan (TW); Yao-Hsien Shao, Taoyuan (TW); Ji Dai, Taoyuan (TW); Tzu-Ting Hsu, Taoyuan (TW); Yen-Wei Tseng, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 537 days.

(21) Appl. No.: 17/804,598

(22) Filed: May 30, 2022

(65) Prior Publication Data

US 2023/0163666 A1  May 25, 2023

(30) Foreign Application Priority Data

Nov. 24, 2021  (CN) .......................... 202111406869.2

(51) Int. Cl.
  *H02K 15/0421*  (2025.01)
  *H02K 1/16*  (2006.01)
  *H02K 3/12*  (2006.01)
  *H02K 3/28*  (2006.01)

(52) U.S. Cl.
  CPC .......... *H02K 15/0421* (2013.01); *H02K 1/16* (2013.01); *H02K 3/12* (2013.01); *H02K 3/28* (2013.01)

(58) Field of Classification Search
  CPC ........ H02K 15/0421; H02K 1/16; H02K 3/12; H02K 3/28; H02K 15/414; H02K 15/043
  See application file for complete search history.

(56) References Cited

U.S. PATENT DOCUMENTS

2022/0311300 A1*  9/2022  Mansir ............... H02K 15/0081

FOREIGN PATENT DOCUMENTS

| CN | 208656531 U | 3/2019 | |
| CN | 111478478 A | 7/2020 | |
| DE | 102015225585 A1 * | 6/2017 | ............... H02K 3/12 |

\* cited by examiner

*Primary Examiner* — Terrance L Kenerly
(74) *Attorney, Agent, or Firm* — CKC & Partners Co., LLC

(57) ABSTRACT

A hairpin stator includes a core, slot-positions and hairpin wires. The core includes a first side and a second side. The slot-positions are configured on the core circumferentially to form M radially-adjacent slot-position layers, wherein M is an odd number greater than or equal to 5. The hairpin wires are configured in the slot-positions and connected to form a plurality of windings. The hairpin wires include a plurality of first U-shaped wires arranged at an outermost slot-position layer in the radial direction and a plurality of second U-shaped wires arranged at an innermost slot-position layer in the radial direction. Each first U-shaped wire includes a U-shaped section arranged at the outermost slot-position layer and protruding from the first side of the core. Each second U-shaped wire includes a U-shaped section arranged at the innermost slot-position layer and protruding from the second side of the core.

20 Claims, 17 Drawing Sheets

HAIRPIN WIRE MOTOR STATOR

CROSS-REFERENCE TO RELATED APPLICATION

This application claims priority to China Application Serial Number 202111406869.2, filed Nov. 24, 2021, which is herein incorporated by reference in its entirety.

BACKGROUND

Field of Invention

The present disclosure relates to a motor stator, and more particularly to a motor stator including hairpin wires.

Description of Related Art

U-shaped hairpin wires are often utilized in a conventional hairpin wire motor stator. U-shaped hairpin wires are inserted into slots of the motor iron core so as to realize the designs of the required winding circuits. Generally speaking, the legs of the U-shaped hairpin wire are joined at the same side of the motor iron core for the convenience of welding. However, it is not easy to adjust the span of the wires on the welding side of the motor iron core in some cases, e.g., stators with odd-numbered slot-position layers, which increases the difficulty of welding construction and consumes man-hours. In view of this, motor manufacturers are actively looking for a better wire arrangement manner to effectively reduce the man-hours and production costs required to manufacture the motor stator.

SUMMARY

The present disclosure proposes a hairpin wire motor stator for overcoming or alleviating the problems of the prior art.

In one or more embodiments, a hairpin wire motor stator includes a ring-shaped stator core and a plurality of slot-positions. The ring-shaped stator core defines a rotor accommodation space at a center of the stator core, wherein the stator core includes a first side and a second side opposite to the first side. The slot-positions are arranged on the stator core and surrounding the rotor accommodation space circumferentially. The slot-positions form M radially-adjacent slot-position layers, wherein M is an odd number greater than or equal to 5. A plurality of hairpin wires are arranged into the slot-positions and connected to form windings. The hairpin wires include a plurality of first U-shaped wires, each first U-shaped wire includes two leg sections located at a radially-outmost one of the slot-position layers. The hairpin wires include a plurality of second U-shaped wires, and each second U-shaped wire includes two leg sections located at a radially-innermost one of the slot-position layers. The hairpin wires include a plurality of third U-shaped wires, and each third U-shaped wire includes two leg sections located at immediately-adjacent two of the slot-position layers between the radially-outmost one and the radially-innermost one of the slot-position layers. The hairpin wires include a plurality of first straight wires, and each first straight wire includes a middle straight section located at a second radially-inner one of the slot-position layers. The hairpin wires include a plurality of second straight wires, and each second straight wire includes a middle straight section located at the radially-outmost one of the slot-position layers.

In one or more embodiments, each first U-shaped wire includes a U-shaped section protruding from the first side of the stator core and two leg ends protruding from the second side of the stator core, wherein each second U-shaped wire includes a U-shaped section protruding from the second side of the stator core and two leg ends protruding from the first side of the stator core, and wherein each third U-shaped wire includes a U-shaped section protruding from the first side of the stator core and two leg ends protruding from the second side of the stator core.

In one or more embodiments, each first straight wire includes a first leg end protruding from the first side of the stator core and a second leg end protruding from the second side of the stator core, and wherein each second straight wire includes a first leg end protruding from the first side of the stator core and a second leg end protruding from the second side of the stator core.

In one or more embodiments, the first leg end of the second straight wire is connected to a phase terminal or a neutral terminal, and wherein the two leg ends of the second U-shaped wire are connected with immediately-adjacent ones of the first leg ends of the first straight wires respectively.

In one or more embodiments, the two leg ends of the first U-shaped wire are connected with immediately-adjacent ones of the two leg ends of the third U-shaped wires respectively, and wherein the second leg end of the first straight wire is connected with immediately-adjacent ones of the two leg ends of the third U-shaped wires respectively.

In one or more embodiments, the stator core includes a plurality of pole regions surrounding the stator core circumferentially, each pole region includes a plurality of the slot-positions, the two leg sections of the first U-shaped wire are spaced apart by a pole pitch across the slot-positions circumferentially, and the two leg sections of the second U-shaped wire are spaced apart by a pole pitch across the slot-positions circumferentially.

In one or more embodiments, the first U-shaped wires include a plurality of first U-shaped wire groups configured to be disposed into corresponding ones of the slot-positions circumferentially, wherein each first U-shaped wire group includes partially-overlapped ones of the first U-shaped wires.

In one or more embodiments, the second U-shaped wires include a plurality of second U-shaped wire groups configured to be disposed into corresponding ones of the slot-positions circumferentially, wherein each second U-shaped wire group includes partially-overlapped ones of the second U-shaped wires.

In one or more embodiments, an end connection of the two leg ends of the second U-shaped wire and the corresponding immediately adjacent first leg end of the first straight wire has an axial height protruding from the stator core which is greater than an axial height of the U-shaped section of the first U-shaped wire protruding from the stator core.

In one or more embodiments, the first leg end of the second straight wire has an axial height protruding from the stator core which is greater than an axial height of the U-shaped section of the first U-shaped wire protruding from the stator core.

In one or more embodiments, an end connection of one of the two leg ends of the first U-shaped wire and corresponding immediately adjacent one of the two leg ends of the third U-shaped wire has an axial height protruding from the stator core which is greater than an axial height of the U-shaped section of the second U-shaped wire protruding from the stator core.

In one or more embodiments, an end connection of the second leg end of the first straight wire and corresponding immediately adjacent one of the two leg ends of the third U-shaped wire has an axial height protruding from the stator core which is greater than an axial height of the U-shaped section of the second U-shaped wire protruding from the stator core.

In one or more embodiments, a hairpin wire motor stator includes a stator core and a plurality of slot-positions. The stator core the stator core includes a first side and a second side opposite to the first side. The slot-positions are arranged on the stator core circumferentially to form M radially-adjacent slot-position layers, wherein M is an odd number greater than or equal to 5. A plurality of hairpin wires is configured to be arranged into the slot-positions and connected to form windings. The hairpin wires includes first U-shaped wires located at a radially-outmost one of the slot-position layers and second U-shaped wires located at a radially-innermost one of the slot-position layers. Each first U-shaped wire includes a U-shaped section protruding from the first side of the stator core and located at the radially-outmost one of the slot-position layers. Each second U-shaped wire includes a U-shaped section protruding from the second side of the stator core and located at the radially-innermost one of the slot-position layers.

In one or more embodiments, the plurality of hairpin wires further comprises third U-shaped wires, each third U-shaped wire includes a U-shaped section protruding from the first side of the stator core and disposed at immediately-adjacent two of the slot-position layers between the radially-outmost one and the radially-innermost one of the slot-position layers.

In one or more embodiments, the plurality of hairpin wires further comprises first straight wires disposed at a second radially-inner one of the slot-position layers and second straight wires disposed at the radially-outmost one of the slot-position layers, wherein the first straight wire is connected between the second U-shaped wire and the third U-shaped wire, and wherein the second straight wire is connected between a phase terminal or a neutral terminal and the third U-shaped wire.

In one or more embodiments, the first straight wire protrudes from the first side of the stator core to connect the second U-shaped wire and protrudes from the second side of the stator core to connect the third U-shaped wire, and wherein the second straight wire protrudes from the first side of the stator core to connect the phase terminal or the neutral terminal and protrudes from the second side of the stator core to connect the third U-shaped wire.

In one or more embodiments, the stator core includes a plurality of pole regions surrounding the stator core circumferentially, each pole region includes a plurality of the slot-positions, the U-shaped section of the first U-shaped wire has a span of a pole pitch across the slot-positions circumferentially, and the U-shaped section of the second U-shaped wire has a span of a pole pitch across the slot-positions circumferentially.

In one or more embodiments, the first U-shaped wires include a plurality of first U-shaped wire groups configured to be disposed into corresponding ones of the slot-positions circumferentially, wherein each first U-shaped wire group includes partially-overlapped U-shaped sections of the first U-shaped wires.

In one or more embodiments, the second U-shaped wires include a plurality of second U-shaped wire groups configured to be disposed into corresponding ones of the slot-positions circumferentially, wherein each second U-shaped wire group includes partially-overlapped U-shaped sections of the second U-shaped wires.

In one or more embodiments, the stator core includes a plurality of pole regions surrounding the stator core circumferentially, each pole region includes a plurality of the slot-positions, the second U-shaped wire groups are disposed with equal spans into corresponding ones of the slot-positions circumferentially, each span is two pole pitches.

The hairpin wire motor stator disclosed herein utilizeds various types of U-shaped wires and various types of straight wires that are appropriately arranged on the motor stator core of an odd-numbered slot-position layers greater than or equal to 5 such that the wire span can be easily adjusted on two opposites sides of the stator core, thereby reducing the difficulty of welding and bonding as well as associated man-hours and costs for bonding and manufacturing.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
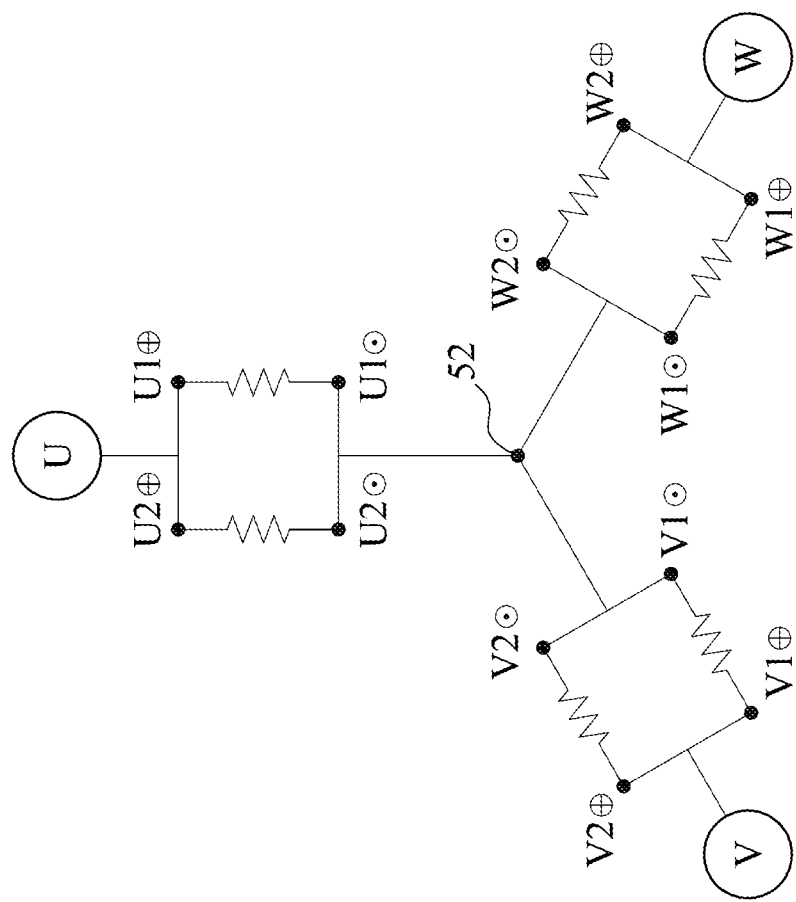
FIG. 1 illustrates a circuit diagram of a motor stator according to an embodiment of the present disclosure.

Reference will now be made in detail to the present embodiments, examples of which are illustrated in the accompanying drawings. Wherever possible, the same reference numbers are used in the drawings and the description to refer to the same or like parts. The "clockwise winding" disclosed herein is to help understand the relative position of the inserting/protruding wire, and it can also be understood as "counterclockwise winding" based on the relative position of the inserting/protruding wire. In other words, from the perspective of mechanical configuration, there is no so-called inserting/protruding wire. From the perspective of the circuit configuration, the positive [⊕] contact can be referred as an inserting, and the negative [⊙] (neutral) contact can be referred as a protruding wire.

Reference is made to FIG. 1, which illustrates a circuit diagram of a motor stator according to an embodiment of the present disclosure. Circuit 50 includes U, V, and W phase windings. Each (U, V, W) phase winding includes two parallel-connected windings, e.g., U1, U2, W1, W2, V1, V2. The negative end (⊙) of each winding is connected to the neutral terminal 52, and the positive end (⊕) of each winding is connected to a corresponding phase terminal (for example, the phase terminals of the U, V, and W phases).

Figure 2:
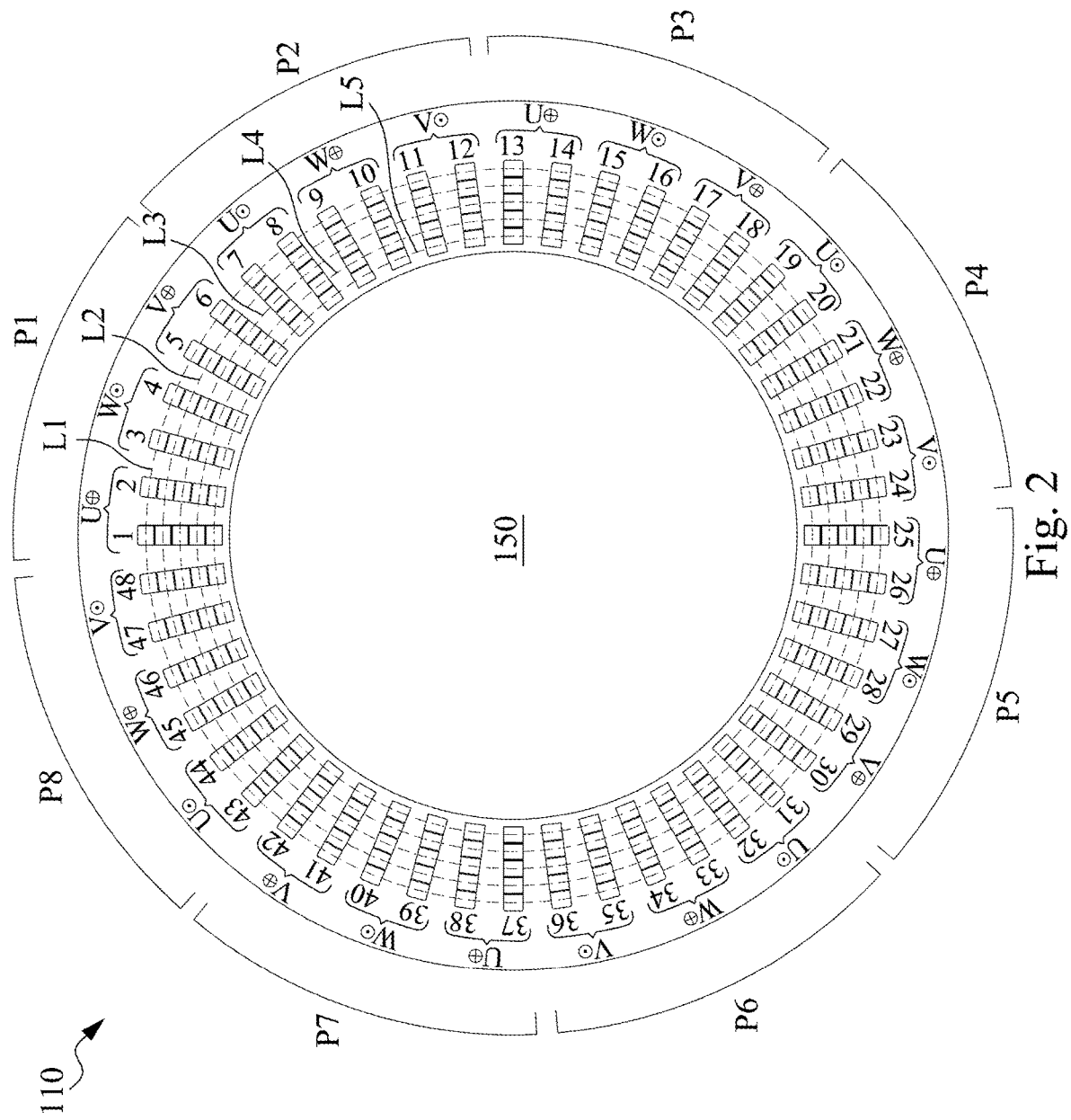
FIG. 2 illustrates a top view of a stator core of a motor stator according to an embodiment of the present disclosure.

Reference is made to FIG. 2, which illustrates a top view of a 48 slot stator core of a motor stator according to an embodiment of the present disclosure. The stator core 110 is used to realize a motor stator with two parallel-connected windings configured in 8 pole regions, 48 (phase) slots, and 5 slot-position layers. Each (phase) slot, i.e., slot 1-48, includes a plurality of radially adjacent slot-positions (i.e., "squares" in each (phase) slot), and each slot-position can accommodate one hairpin wire. All slot-positions surround the rotor accommodating space 150 in the circumferential direction, and form a plurality of slot-position layers (L1 to L5) adjacent in the radial direction. The 8 pole regions equally divide the stator core 110 in the circumferential direction, and each pole region has one of the U, V, and W phases. The pole region P1 has slots 1-6, the pole region P2 has slots 7-12, the pole region P3 has slots 13-18, the pole region P4 has slots 19-24, the pole region P5 has slots 25-30, the pole region P6 has slots 31-36, the pole region P7 has slots 37-42, and the pole region P8 has slots 43-48. A span across (phase) slots of a single pole region in the circumferential direction is defined as a pole pitch. Each (phase) slot allows 5 hairpin wires to be inserted into 5 slot-position layers from the outside to the inside for L1 to L5 layers. The ring-shaped stator core 110 defines a rotor accommodating space 150 for accommodating the rotor. The L5 layer is closest to the rotor accommodating space 150 as a radially-innermost one of the slot-position layers, and the L1 layer is the farthest from the rotor accommodating space 150 as a radially-outmost one of the slot-position layers. In some embodiments of the present disclosure, the (phase) slots in the pole regions have the same or nearly the same cross-sectional dimensions, and the spacing between the (phase) slots is also the same or nearly the same, but not being limited to thereto.

Figure 3:
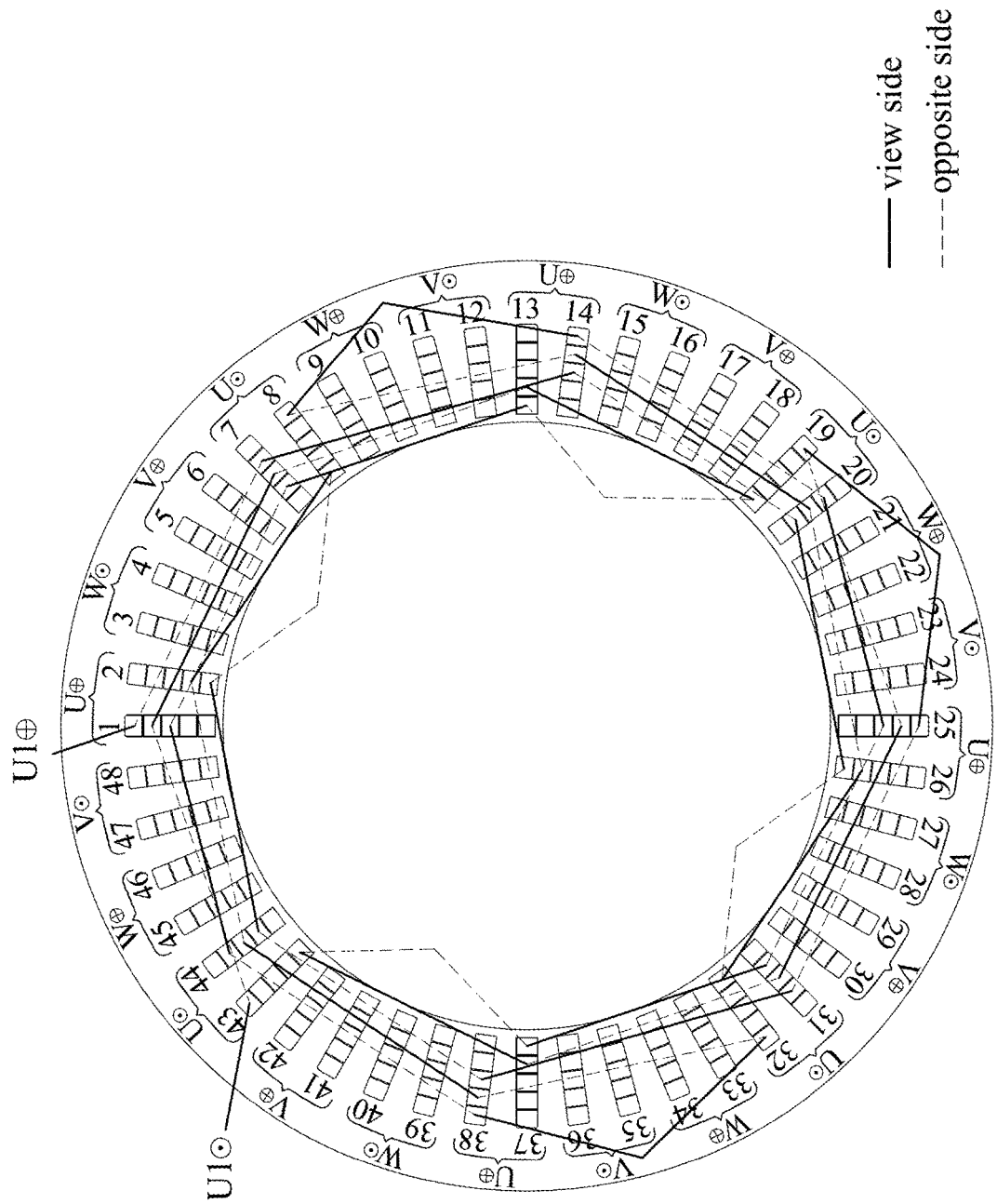
FIG. 3 illustrates a winding U1 configured in U phases of a 48-slot motor stator according to an embodiment of the present disclosure.

Reference is made to FIG. 3, which illustrates a winding U1 configured in U phases of a 48-slot motor stator according to an embodiment of the present disclosure. Take the stator core 110 as an example to realize a motor stator with 8 pole regions, 48 slots, and 5 slot-position layers, and each of U, V, and W phases has two parallel windings respectively. The stator core 110 includes opposite sides. In the figure, the "view side" and the "opposite side" are supplemented with solid and dashed lines respectively to demonstrate the wire connection and cross-slot winding configuration. Although the wire connection/cross-slot is shown in the straight line and V-shaped line in the figures, it is only for illustration and not limited to such shapes.

Take U phase as an example first, a leg end (U1⊕) of the wire of winding U1 is entered into the slot-position of slot-position layer L1 of the U-phase slot 1 from the view side of stator core 110 (e.g., the first side 110a of FIG. 11), and then connected to the slot-position of the slot-position layer L2 of the U-phase slot 7 on the opposite side of stator core 110 (e.g., the second side 110b in FIG. 11), and then connected to the slot-position of the slot-position layer L3 of the U-phase slot 14 on the view side of stator core, then connected to the slot-position of the slot-position layer L4 of the U-phase slot 20 on the opposite side of stator core, and then connected to the slot-position of the slot-position layer L5 of the U-phase slot 26 on the view side of stator core, and then connected to the slot-position of the slot-position layer L5 of the U-phase slot 32 on the opposite side of the stator core. The winding U1 is wound here from slot 1 to slot 32 in a clockwise direction. The winding U1 is then connected to the slot-position of the slot-position layer L4 of the U-phase slot 26 on the view side of stator core, and then connected to the slot-position of the slot-position layer L3 of the U-phase slot 20 on the opposite side of stator core, then connected to the slot-position of the slot-position layer L2 of the U-phase slot 14 on the view side of stator core, and then connected to the slot-position of the slot-position layer L1 of the U-phase slot 8 on the opposite side of stator core. The winding U1 is wound here from the slot 32 to the slot 8 in a counterclockwise direction, and then connected to the slot-position of the slot-position layer L1 of the U-phase slot 14 on the view side of stator core in a clockwise direction. The winding U1 is then connected to the slot-position of the slot-position layer L2 of the U-phase slot 20 on the opposite side of stator core, and then connected to the slot-position of the slot-position layer L3 of the U-phase slot 25 on the view side of stator core, then connected to the slot-position of the slot-position layer L4 of the U-phase slot 31 on the opposite side of stator core, then connected to the slot-position of the slot-position layer L5 of the U-phase slot 37 on the view side of stator core, and then connected to the slot-position of the slot-position layer L5 of the U-phase slot 43 on the opposite side of stator core. The winding U1 is wound here from slot 8 to slot 43 in a clockwise direction. The winding U1 is then connected to the slot-position of the slot-position layer L4 of the U-phase slot 37 on the view side of stator core, and then connected to the slot-position of the slot-position layer L3 of the U-phase slot 31 on the opposite side of stator core, then connected to the slot-position of the slot-position layer L2 of the U-phase slot 25 on the view side of stator core, and then connected to the slot-position of the slot-position layer L1 of the U-phase slot 19 on the opposite side of stator core. The winding U1 is wound here from slot 43 to slot 19 in a counterclockwise direction. The winding U1 is then connected to the slot-position of the slot-position layer L1 of the U-phase slot 25 on the view side of stator core in the clockwise direction, and then connected to the slot-position of the slot-position layer L2 of the U-phase slot 31 on the opposite side of stator core, then connected to the slot-position of the slot-position layer L3 of the U-phase slot 38 on the view side of stator core, and then connected to the slot-position of the slot-position layer L4 of the U-phase slot 44 on the opposite side of stator core, then connected to the slot-position of the slot-position layer L5 of the U-phase slot 2 on the view side of stator core, and then connected to the slot-position of the slot-position layer L5 of the U-phase slot 8 on the opposite side of stator core. The winding U1 is wound here from slot 19 to slot 8 in a clockwise direction. The winding U1 is then connected to the slot-position of the slot-position layer L4 of the U-phase slot 2 on the view side of stator core, and then connected to the slot-position of the slot-position layer L3 of the U-phase slot 44 on the opposite side of stator core, then connected to the slot-position of the slot-position layer L2 of the U-phase slot 38 on the view side of stator core, and then connected to the slot-position of the slot-position layer L1 of the U-phase slot 32 on the opposite side of stator core. The winding U1 is wound here from slot 8 to slot 32 in a counterclockwise direction. The winding U1 is then connected to the slot-position of the slot-position layer L1 of the U-phase slot 38 on the view side of stator core, and then connected to the slot-position of the slot-position layer L2 of the U-phase slot 44 on the opposite side of stator core, then connected to the slot-position of slot-position layer L3 of the U-phase slot 1 on the view side of stator core, then connected to the slot-position of slot-position layer L4 of U-phase slot 7 on the opposite side of stator core, and then connected to the slot-position of the slot-position layer L5 of the U-phase slot 13 on the view side of stator core, and then connected to the slot-position of the slot-position layer L5 of the U-phase slot 19 on the opposite side of stator core. The winding U1 is wound here from slot 32 to slot 19 in a clockwise direction. The winding U1 is then connected to the slot-position of the slot-position layer L4 of the U-phase slot 13 on the view side of stator core, and then connected to the slot-position of the slot-position layer L3 of the U-phase slot 7 on the opposite side of stator core, then connected to the slot-position of the slot-position layer L2 of the U-phase slot 1 on the view side of stator core, and then connected to the slot-position of the slot-position layer L1 of the U-phase slot 43 on the opposite side of stator core. The winding U1 is wound here from slot 19 to slot 43 in a counterclockwise direction and its leg end (U1⊙) exits at this slot-position.

Figure 4:
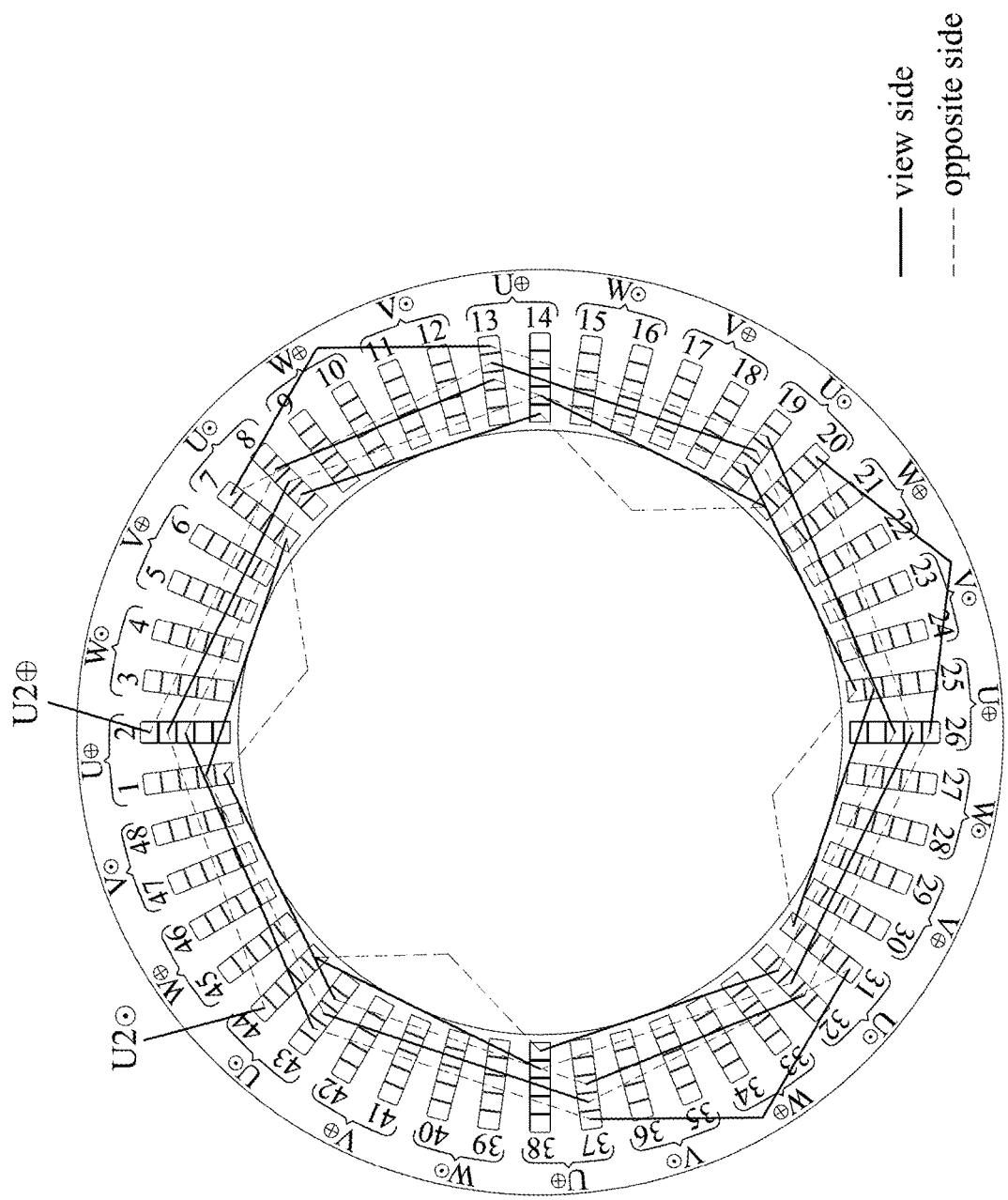
FIG. 4 illustrates a winding U2 configured in U phases of a 48-slot motor stator according to an embodiment of the present disclosure.

Reference is made to FIG. 4, which illustrates a winding U2 configured in U phases of a 48-slot motor stator according to an embodiment of the present disclosure. Continuing with the winding U1 shown in FIG. 3, a leg end (U2⊕) of the wire of the winding U2 is entered into the slot-position of the slot-position layer L1 of the slot 2 from the view side of the stator core, and then connected to the slot-position of the slot-position layer L2 of the U-phase slot 8 on the opposite side of the stator core, then connected to the slot-position of the slot-position layer L3 of the U-phase slot 13 on the view side of the stator core, and then connected to the slot-position of the slot-position layer L4 of the U-phase slot 19 on the opposite side of the stator core, then connected to the slot-position of the slot-position layer L5 of the U-phase slot 25 on the view side of the stator core, and then connected to the slot-position of the slot-position layer L5 of the U-phase slot 31 on the opposite side of the stator core. The winding U2 is wound here from slot 2 to slot 31 in a clockwise direction. The winding U2 is then connected to the slot-position of the slot-position layer L4 of the U-phase slot 25 on the view side of the stator core, and then connected to the slot-position of the slot-position layer L3 of the U-phase slot 19 on the opposite side of the stator core, then connected to the slot-position of the slot-position layer L2 of the U-phase slot 13 on the view side of the stator core, and connected to the slot-position of the slot-position layer L1 of the U-phase slot 7 on the opposite side of the stator core. The winding U2 is wound here from slot 31 to slot 7 in a counterclockwise direction. The winding U2 is then connected to the slot-position of the slot-position layer L1 of the U-phase slot 13 on the view side of the stator core, and then connected to the slot-position of the slot-position layer L2 of the U-phase slot 19 on the opposite side of the stator core, then connected to the slot-position of the slot-position layer L3 of the U-phase slot 26 on the view side of the stator core, and connected to the slot-position of the slot-position layer L4 of the U-phase slot 32 on the opposite side of the stator core, then connected to the slot-position of the slot-position layer L5 of the U-phase slot 38 on the view side of the stator core, and connected to the slot-position of the slot-position layer L5 of the U-phase slot 44 on the opposite side of the stator core. The winding U2 is wound here from slot 7 to slot 44 in a clockwise direction. The winding U2 is then connected to the slot-position of the slot-position layer L4 of the U-phase slot 38 on the view side of the stator core, and is connected the slot-position of the slot-position layer L3 of the U-phase slot 32 on the opposite side of the stator core, then connected to the slot-position of the slot-position layer L2 of the U-phase slot 26 on the view side of the stator core, and connected to the slot-position of the slot-position layer L1 of the U-phase slot 20 on the opposite side of the stator core. Winding U2 is here wound from slot 44 to slot 20 in a counterclockwise direction. The winding U2 is then connected to the slot-position of the slot-position layer L1 of the U-phase slot 26 on the view side of the stator core in a clockwise direction, and then connected to the slot-position of the slot-position layer L2 of the U-phase slot 32 on the opposite side of the stator core, then connected to the slot-position of the slot-position layer L3 of the U-phase slot 37 on the view side of the stator core, and connected to the slot-position of the slot-position layer L4 of the U-phase slot 43 on the opposite side of the stator core, then connected to the slot-position of the slot-position layer L5 of the U-phase slot 1 on the view side of stator core, and then connected to slot-position of the slot-position layer L5 of the U-phase slot 7 on the opposite side of stator core. The winding U2 is wound here from slot 20 to slot 7 in a clockwise direction. The winding U2 is then connected to the slot-position of the slot-position layer L4 of the U-phase slot 1 on the view side of the stator core, and then connected to the slot-position of the slot-position layer L3 of the U-phase slot 43 on the opposite side of the stator core, then connected to the slot-position of the slot-position layer L2 of the U-phase slot 37 on the view side of the stator core, and connected to the slot-position of the slot-position layer L1 of the U-phase slot 31 on the opposite side of the stator core. The winding U2 is here wound from slot 7 to slot 31 in a counterclockwise direction. The winding U2 is then connected to the slot-position of the slot-position layer L1 of the U-phase slot 37 on the view side of the stator core, and connected to the slot-position of the slot-position layer L2 of the U-phase slot 43 on the opposite side of the stator core, then connected to the slot-position of the slot-position layer L3 of the U-phase slot 2 on the view side of the stator core, and then connected to the slot-position of the slot-position layer L4 of the U-phase slot 8 on the opposite side of the stator core, then connected to the slot-position of the slot-position layer L5 of the U-phase slot 14 on the view side of the stator core, and connected to the slot-position of the slot-position layer L5 of the U-phase slot 20 on the opposite side of the stator core. The winding U2 is wound here from slot 31 to slot 20 in a clockwise direction. The winding U2 is then connected to the slot-position of the slot-position layer L4 of the U-phase slot 14 on the view side of the stator core, and then connected to the slot-position of the slot-position layer L3 of the U-phase slot 8 on the opposite side of the stator core, then connected to the slot-position of the slot-position layer L2 of the U-phase slot 2 on the view side of the stator core, and connected to the slot-position of the slot-position layer L1 of the U-phase slot 44 on the opposite side of the stator core. The winding U2 is wound here from slot 20 to slot 44 in a counterclockwise direction and its leg end (U20) exits at this slot-position. All the wires of windings U1 and U2 occupy all U phase slot-positions of the stator core 110 to achieve two parallel-connected windings.

Figure 5:
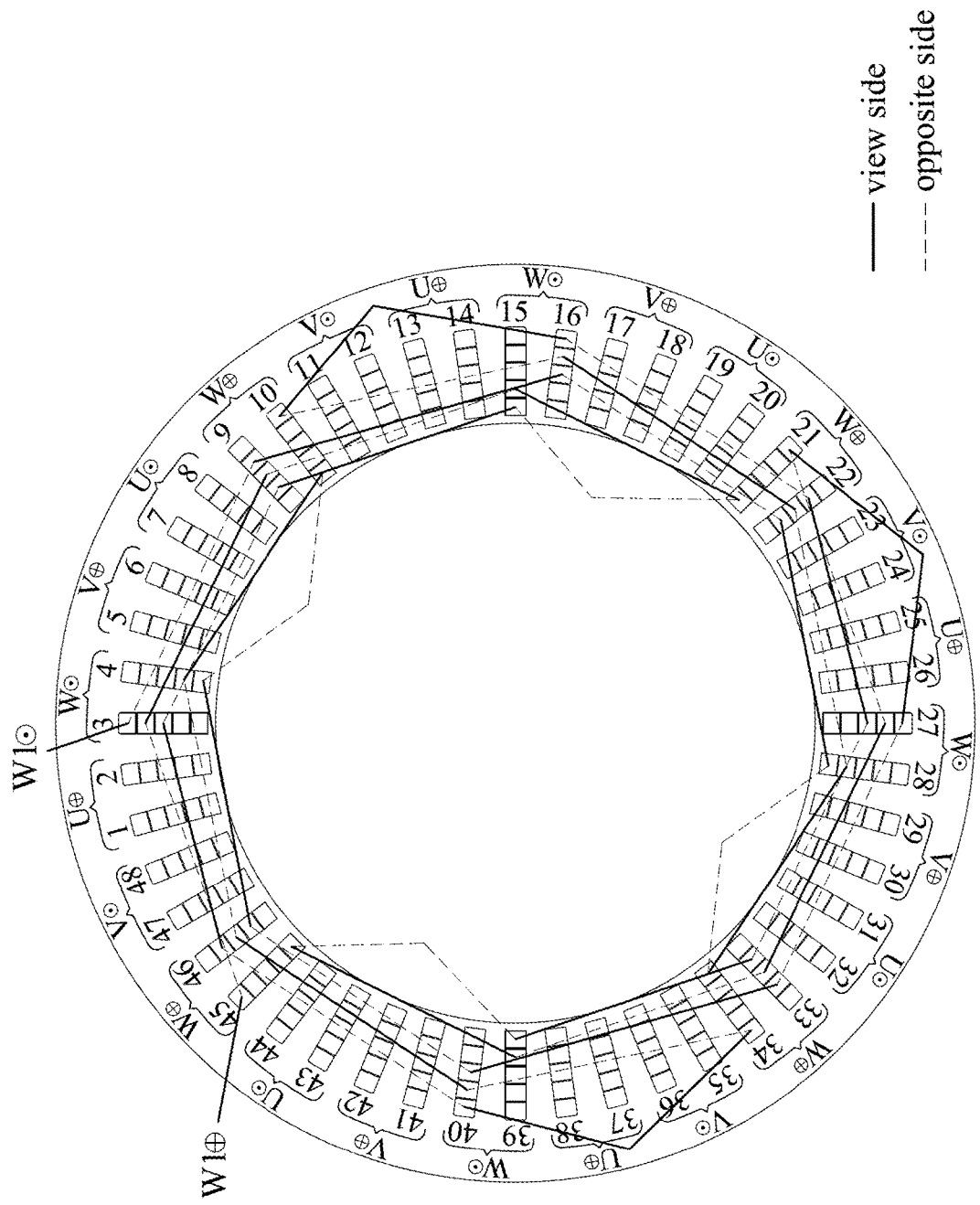
FIG. 5 illustrates a winding W1 configured in W phases of a 48-slot motor stator according to an embodiment of the present disclosure.

Reference is made to FIG. 5, which illustrates a winding W1 configured in W phases of a 48-slot motor stator according to an embodiment of the present disclosure. The wires of winding W1 are arranged in the slot-positions across W phases of the stator core, and the wire configurations crossing the slots in the circumferential direction and the slot-position layers in the radial direction are the same as or similar to the wire configurations of winding U1, so the description will not be repeated.

Figure 6:
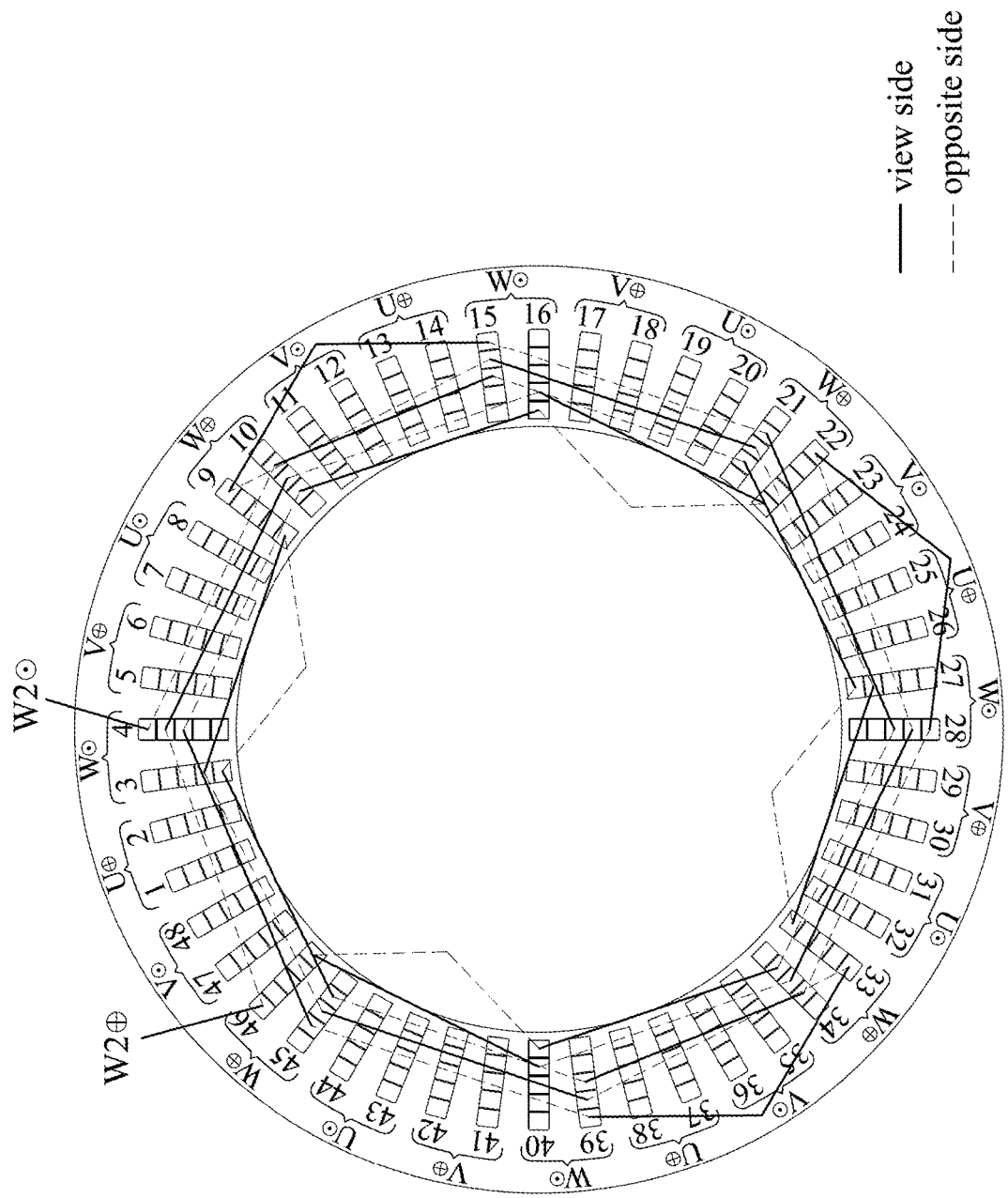
FIG. 6 illustrates a winding W2 configured in W phases of a 48-slot motor stator according to an embodiment of the present disclosure.

Reference is made to FIG. 6, which illustrates a winding W2 configured in W phases of a 48-slot motor stator according to an embodiment of the present disclosure. The wires of winding W2 are arranged in the slot-positions across W phases of the stator core, and the wire configurations crossing the slots in the circumferential direction and the slot-position layers in the radial direction are the same as or similar to the wire configurations of winding U2, so the description will not be repeated.

Figure 7:
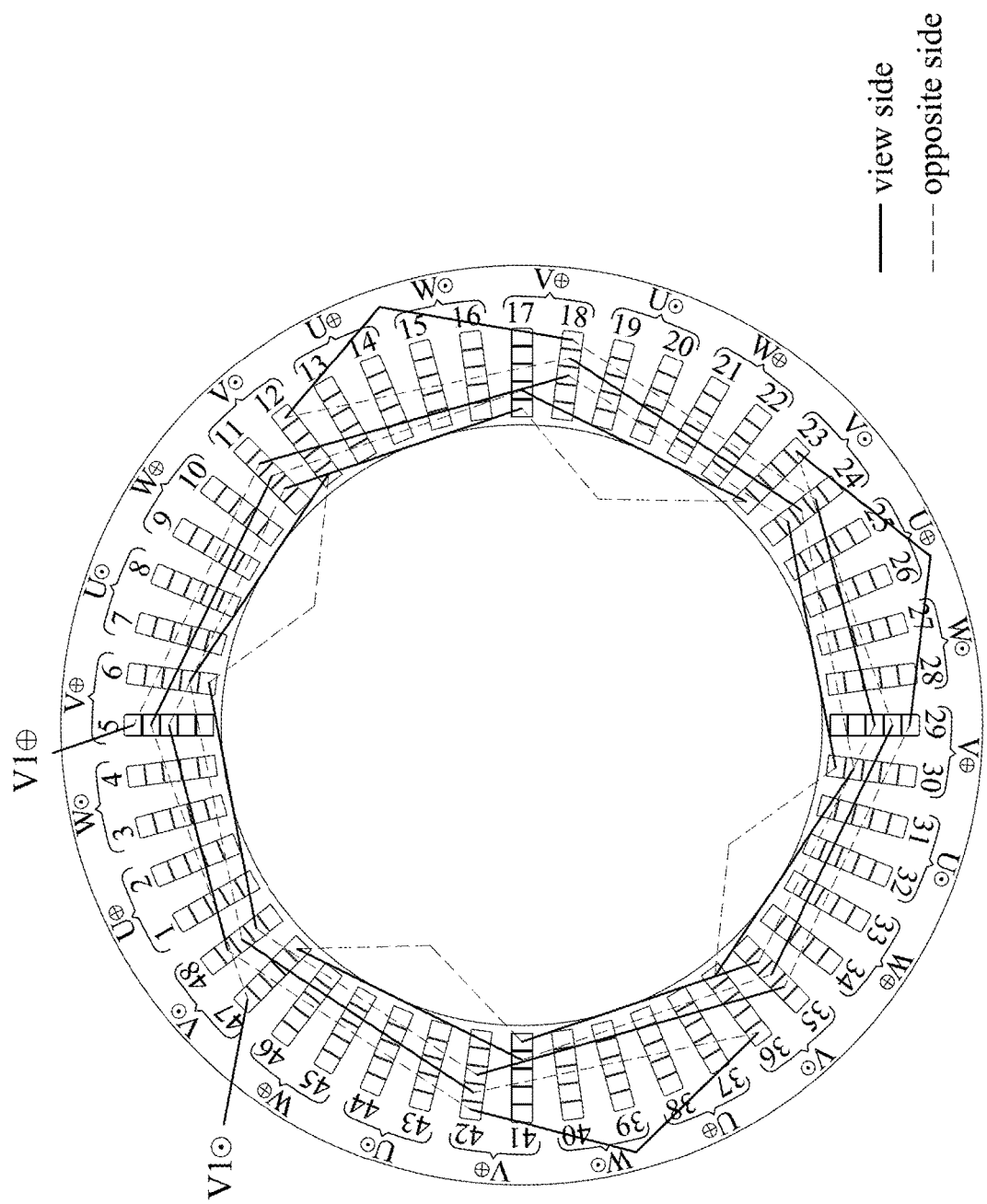
FIG. 7 illustrates a winding V1 configured in V phases of a 48-slot motor stator according to an embodiment of the present disclosure.

Reference is made to FIG. 7, which illustrates a winding V1 configured in V phases of a 48-slot motor stator according to an embodiment of the present disclosure. The wires of winding V1 are arranged in the slot-positions across V phases of the stator core, and the wire configurations crossing the slots in the circumferential direction and the slot-position layers in the radial direction are the same as or similar to the wire configurations of winding U1, so the description will not be repeated.

Figure 8:
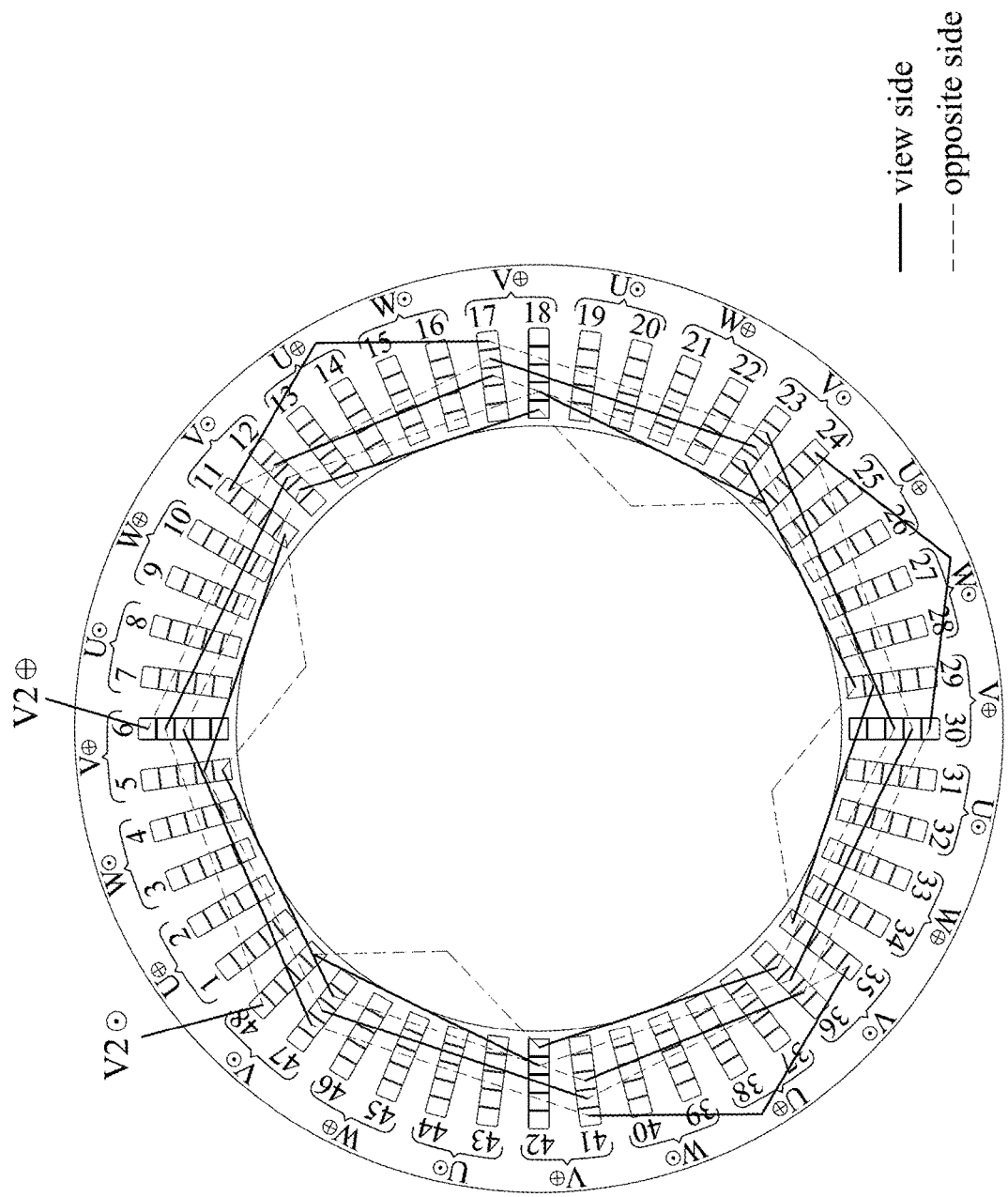
FIG. 8 illustrates a winding V2 configured in V phases of a 48-slot motor stator according to an embodiment of the present disclosure.

Reference is made to FIG. 8, which illustrates a winding V2 configured in V phases of a 48-slot motor stator according to an embodiment of the present disclosure. The wires of winding V2 are arranged in the slot-positions across V phases of the stator core, and the wire configurations crossing the slots in the circumferential direction and the slot-position layers in the radial direction are the same as or similar to the wire configurations of winding U2, so the description will not be repeated.

Figure 9:
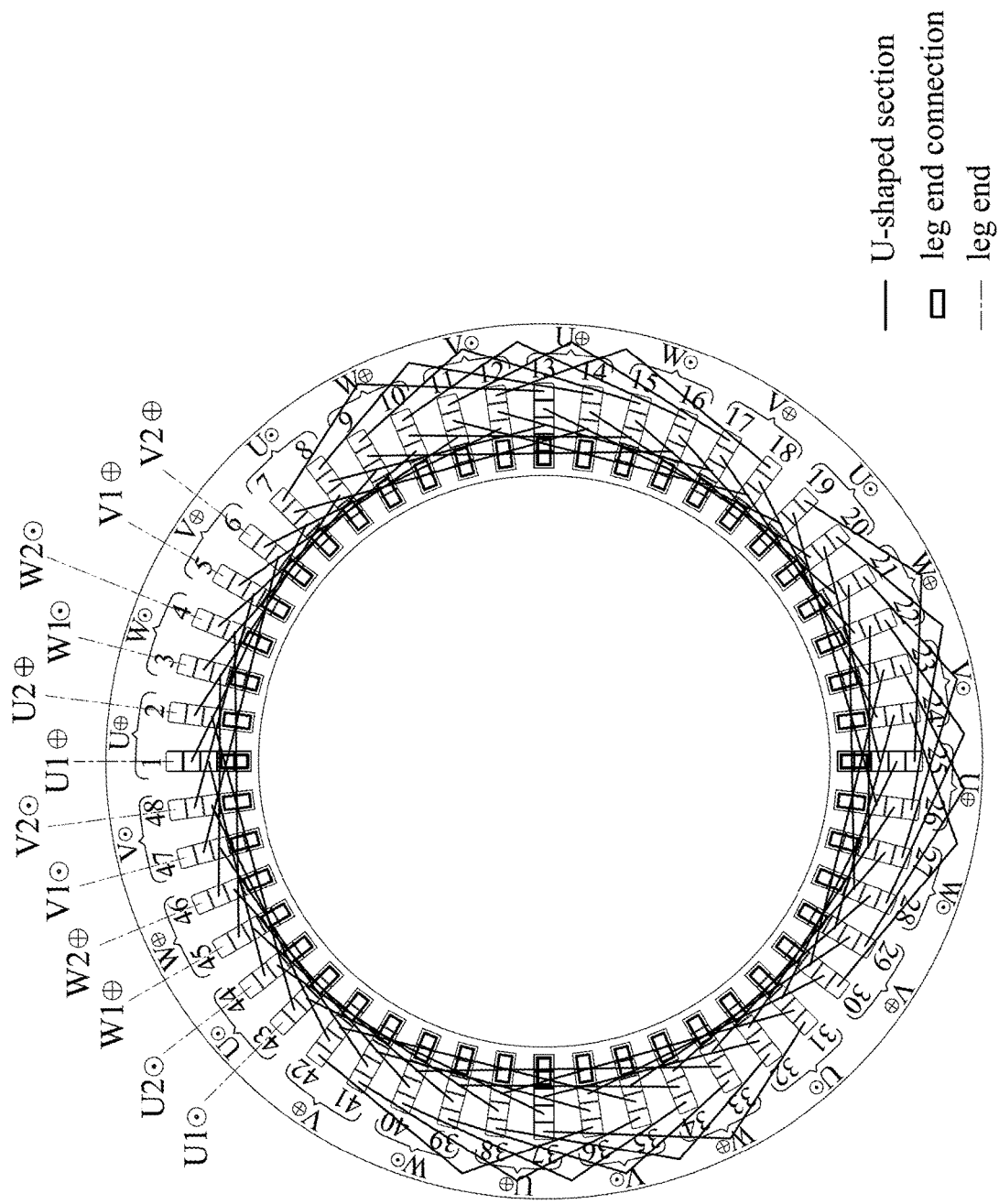
FIG. 9 illustrates windings configured in U, W, V phases at a first side of a 48-slot motor stator according to an embodiment of the present disclosure.

Reference is made to FIG. 9, which illustrates windings configured in U, W, V phases at a first side 110a of a 48-slot motor stator according to an embodiment of the present disclosure. After windings (U1, U2, W1, W2, V1, V2) are all arranged in the stator core, the "U-shaped section" protruding from the U-shaped wire is represented by a solid line, the "leg end connection" is represented by a bold rectangle, and the "leg end" is represented by a dashed line on the first side 110a of the stator core 110. Two ends of the U-shaped section of each first U-shaped wire are located in the radially outermost slot-position layer (i.e., slot-position layer L1), and two ends of the U-shaped section of remaining each U-shaped wire (i.e., the third U-shaped wires described below) are located in the radially adjacent two middle slot-position layers (i.e., slot-position layers L2-L3). The "leg end connection" of the first side 110a is located at the two inner slot-position layers (i.e., slot-position layers L4-L5) that are radially adjacent to each other. The outermost slot-position layer (i.e., slot-position layer L1) also has leg ends (U1⊕, U2⊕, W1⊕, W2⊕, V1⊕, V2⊕) connected to corresponding phase terminals (such as phase terminals of phase W, U, V), and other leg ends (U1⊙, U2⊙, W1⊙, W2⊙, V1⊙, V2⊙) connected to the neutral terminals (Neutral End).

Figure 10:
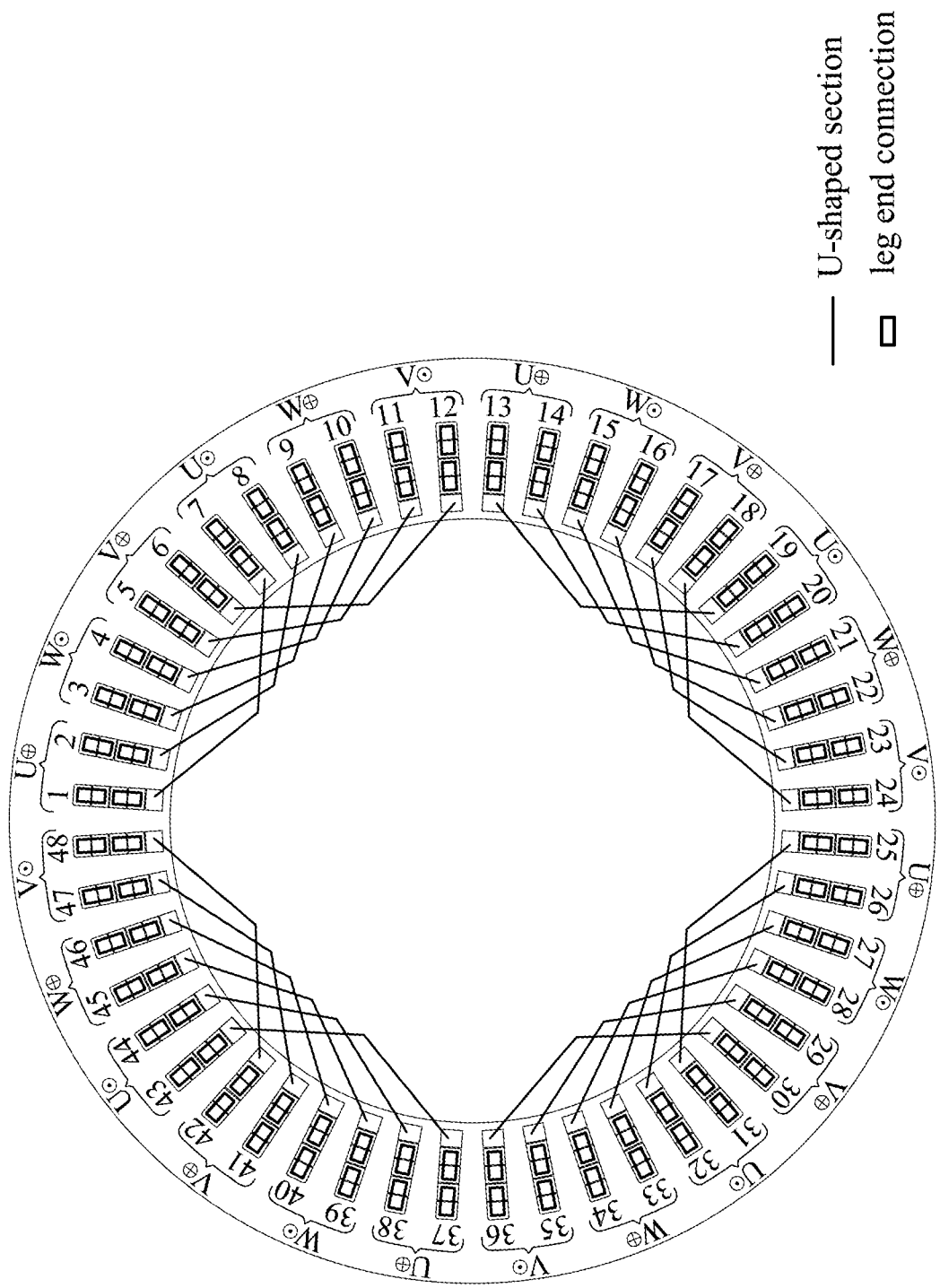
FIG. 10 illustrates windings configured in U, W, V phases at a second side of a 48-slot motor stator according to an embodiment of the present disclosure.

Reference is made to FIG. 10, which illustrates windings configured in U, W, V phases at a second side 110b of a 48-slot motor stator according to an embodiment of the present disclosure. After windings (U1, U2, W1, W2, V1, and V2) are all arranged on the stator core 110, the "U-shaped section" protruding from the U-shaped wire is represented by a solid line and the "leg end connection" is represented by a bold rectangle on the second side 110b of the stator core 110. Two ends of the U-shaped section of each U-shaped wire (i.e., the second U-shaped wire described below) are located in the radially innermost slot-position layer (i.e., the slot-position layer L5). The "leg end connection" of the second side 110b is located at the radially adjacent two outer slot-position layers (i.e., slot-position layers L1-L2) and radially adjacent two middle slot-position layers (i.e., slot-position layers L3-L4).

Figure 11:
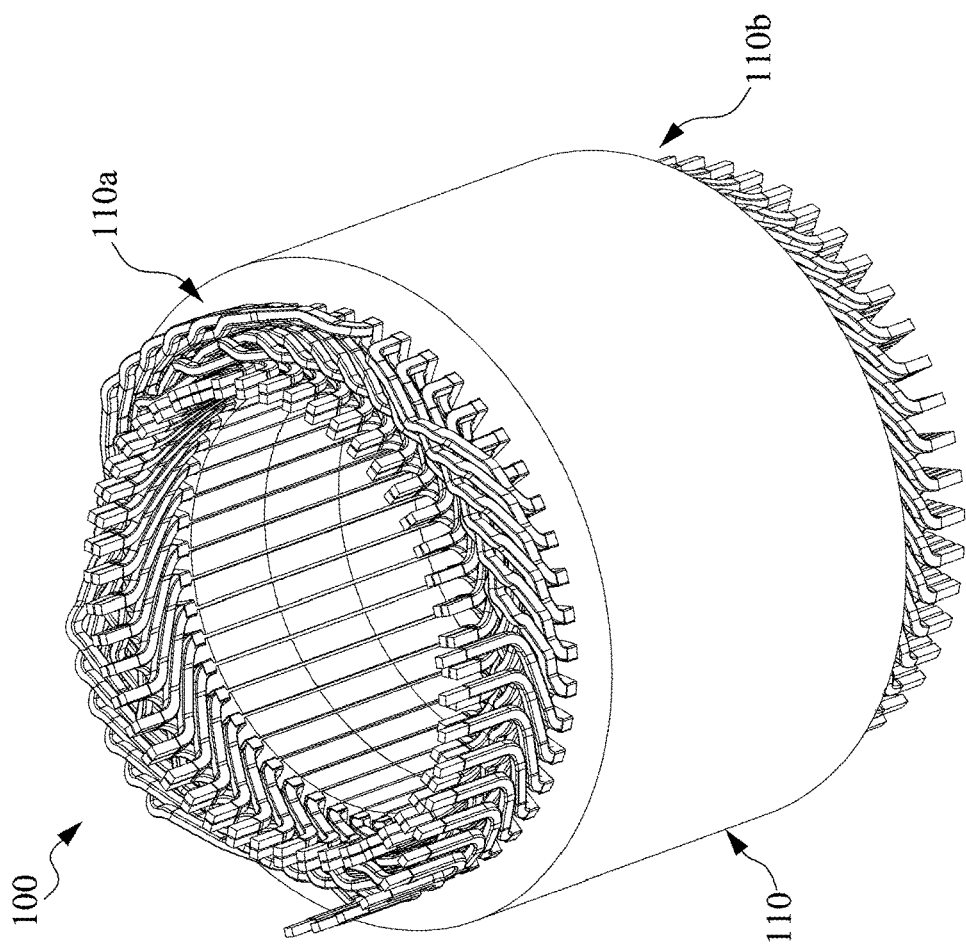
FIG. 11 illustrates a perspective view of a 48-slot motor stator according to an embodiment of the present disclosure.

Reference is made to FIG. 11, which illustrates a perspective view of a 48-slot motor stator 100 according to an embodiment of the present disclosure. The motor stator 100 is used to realize a three-phase motor stator with two parallel-connected windings configured in the stator core 110 with 8 pole regions, 48 (phase) slots, and 5 slot-position layers. The first side 110a and the second side 110b of the stator core 110, which are axially opposite to each other, correspond to the first side 110a in FIG. 9 and the second side 110b in FIG. 10, respectively.

Figure 12:
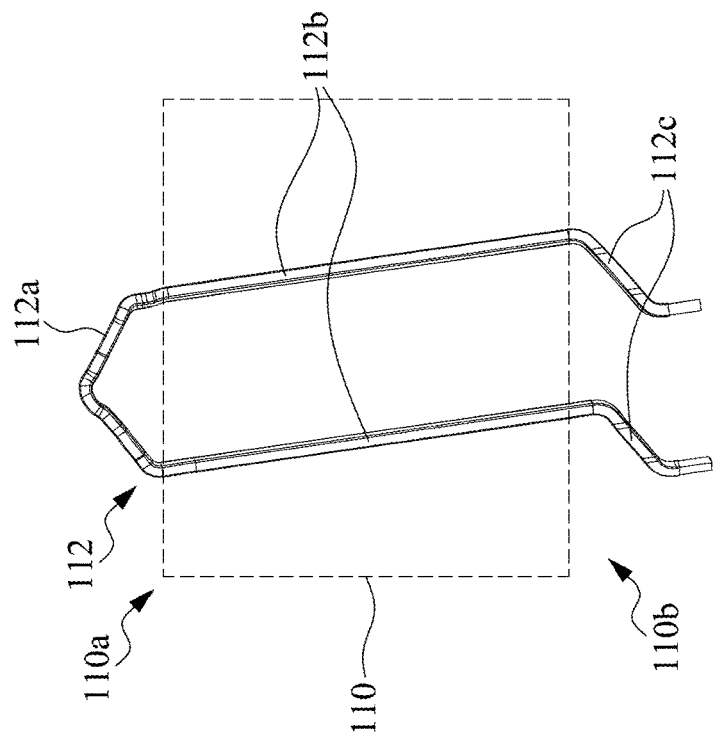
FIG. 12 illustrates a first U-shaped wire configured in a stator core according to an embodiment of the present disclosure.
Figure 14:
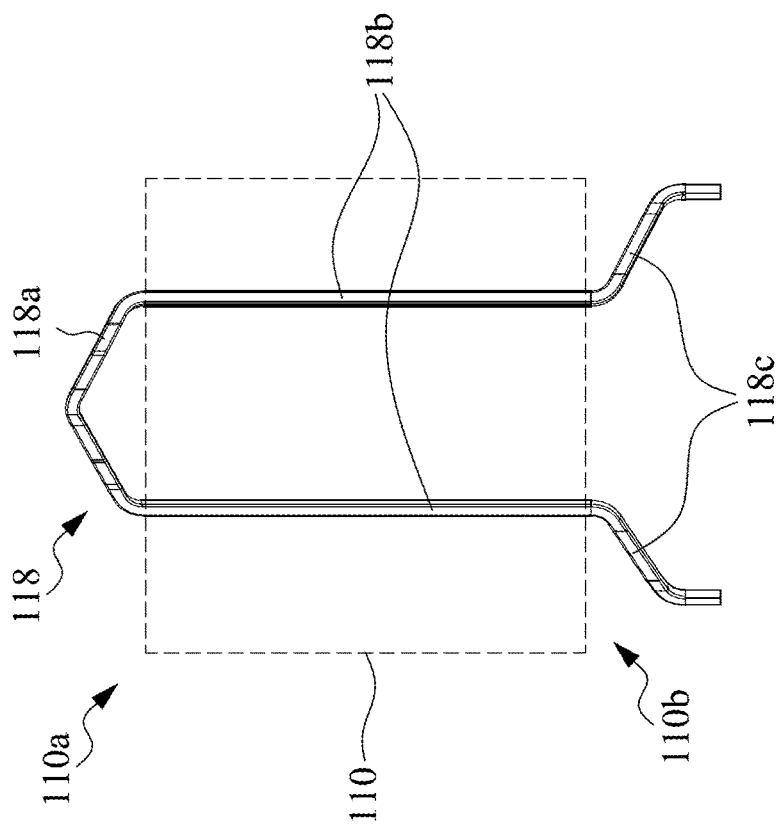
FIG. 14 illustrates a third U-shaped wire configured in a stator core according to an embodiment of the present disclosure.
Figure 13:
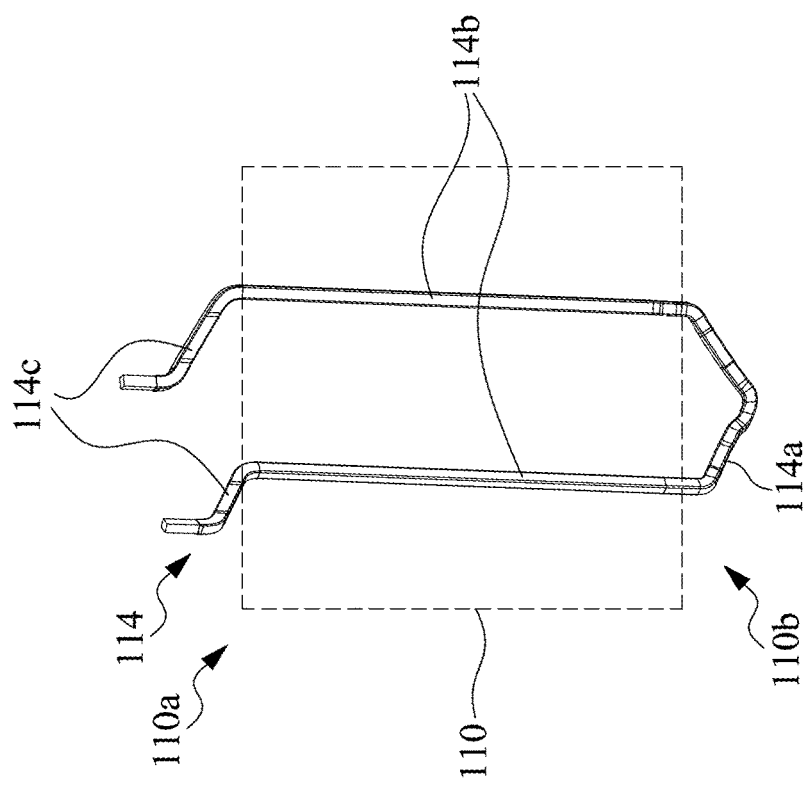
FIG. 13 illustrates a second U-shaped wire configured in a stator core according to an embodiment of the present disclosure.

Reference is made to FIGS. 12-14, which illustrate three types of U-shaped wires configured in a stator core according to an embodiment of the present disclosure. The first U-shaped wire 112 includes a U-shaped section 112a, two leg sections 112b and two leg ends 112c. The U-shaped section 112a protrudes from the first side 110a of the stator core 110, the two leg ends 112c protrude from the second side 110b of the stator core 110, and the two leg sections 112b are arranged in the slot-positions of the stator core 110. The second U-shaped wire 114 includes a U-shaped section 114a, two leg sections 114b and two leg ends 114c. The U-shaped section 114a protrudes from the second side 110b of the stator core 110, the two leg ends 114c protrude from the first side 110a of the stator core 110, and the two leg sections 114b are arranged in the slot-positions of the stator core 110. The third U-shaped wire 118 includes a U-shaped section 118a, two leg sections 118b and two leg ends 118c. The U-shaped section 118a protrudes from the first side 110a of the stator core 110, the two leg ends 118c protrude from the second side 110b of the stator core 110, and the two leg sections 118b are arranged in the slot-positions of the stator core 110. Three types of U-shaped wires will be described in detail below about how they are associated with other components.

Figure 16:
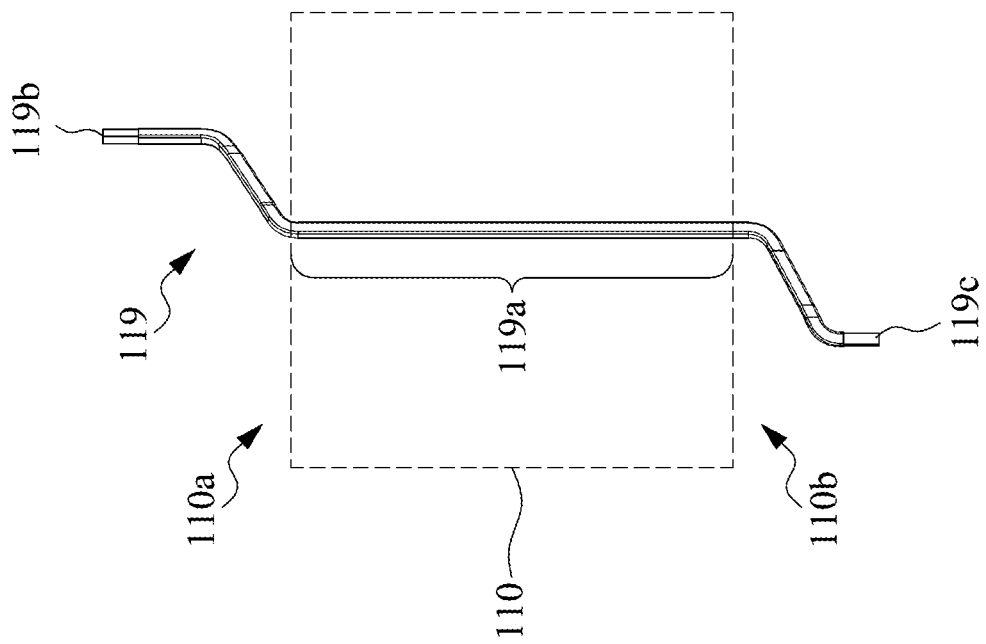
FIG. 16 illustrates a second straight wire configured in a stator core according to an embodiment of the present disclosure.
Figure 15:
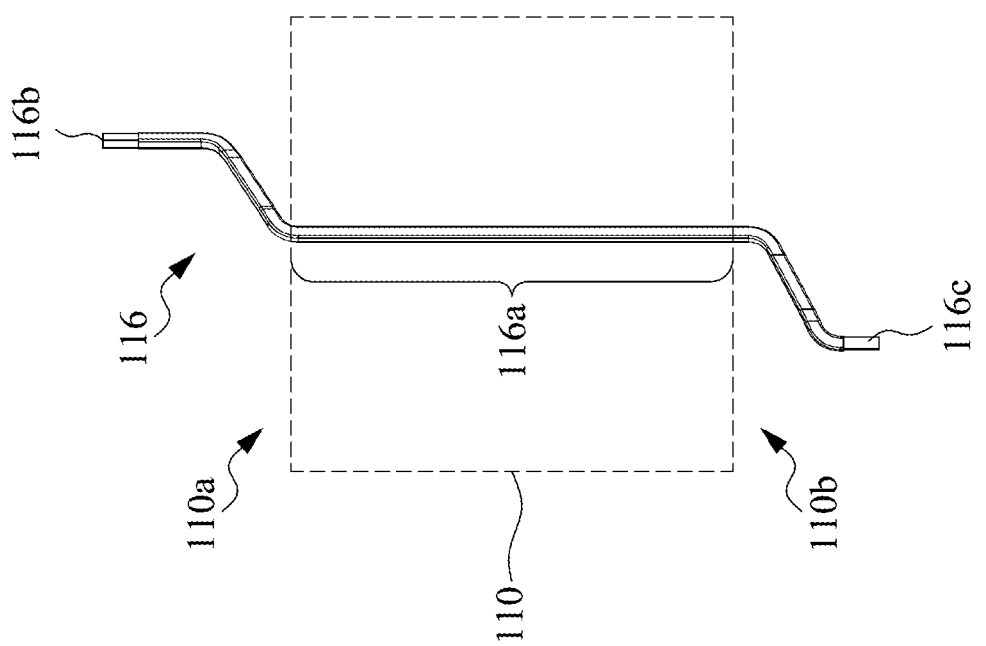
FIG. 15 illustrates a first straight wire configured in a stator core according to an embodiment of the present disclosure.

Reference is made to FIGS. 15-16, which illustrate two types of straight wires configured in a stator core according to an embodiment of the present disclosure. A first straight wire 116 includes a middle straight section 116a and two opposite leg ends 116b and 116c. The leg end 116b protrudes from the first side 110a of the stator core 110, the leg end 116c protrudes from the second side 110b of the stator core 110, and the middle straight section 116a is configured in the slot-position of the stator core 110. A second straight wire 119 includes a middle straight section 119a and two opposite leg ends 119b and 119c. The leg end 119b protrudes from the first side 110a of the stator core 110, the leg end 119c protrudes from the second side 110b of the stator core 110, and the middle straight section 119a is configured in the slot-position of the stator core 110. Two types of straight wires will be described in detail below about how they are associated with other components.

Figure 17:
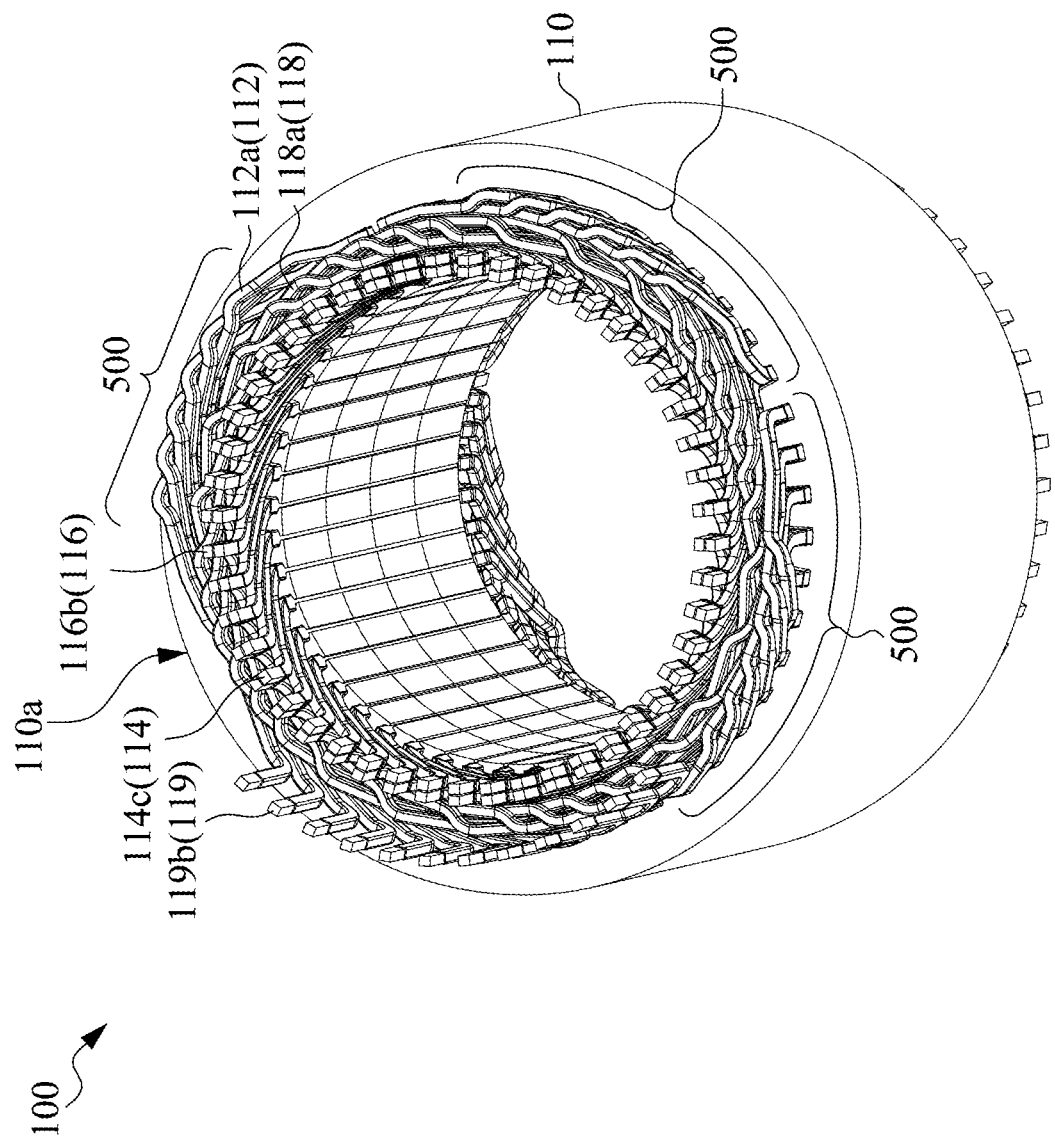
FIG. 17 illustrates a perspective view of a wire configuration at a first side of a motor stator according to an embodiment of the present disclosure.

Reference is made to FIG. 17, which illustrates a perspective view of a wire configuration at a first side 110a of a motor stator according to an embodiment of the present disclosure. The wire configuration includes a plurality of first U-shaped wires 112, and each first U-shaped wire 112 includes two leg sections 112b, both of which are arranged on the outermost slot-position layer L1 in the radial direction, so the U-shaped section 112a protrudes from the outermost slot-position layer L1 in the radial direction and is also arranged on the outermost slot-position layer L1 on the first side 110a of the stator core 110, and a distance between the two leg sections 112b in the circumferential direction is a pole pitch (also referring to the U-shaped section at the outermost slot-position layer in FIG. 9). The first U-shaped wires 112 form three first U-shaped wire groups 500 on the first side 110a of the stator core 110. Each first U-shaped wire group 500 includes 6 partially-overlapped U-shaped sections 112a of the first U-shaped wires 112. The wire configuration also includes a plurality of third U-shaped wires 118, and each third U-shaped wire 118 includes two leg sections 118b, which are located in two radially adjacent slot-position layers (i.e., L2-L3) respectively, and the two radially adjacent slot-position layers L2-L3 are located between the outermost slot-position layer (L1) and the innermost slot-position layer (L5). Therefore, when the U-shaped section 118a protrudes from the first side 110a of the stator core 110, it is also arranged on the middle slot-position layers (also referring to the U-shaped section at the middle slot-position layers in FIG. 9). The wire configuration also includes a plurality of second straight wires 119, and each second straight wire 119 includes a middle straight section 119a located on the outermost slot-position layer (L1) in the radial direction. Therefore, when its leg end 119b protrudes from the first side 110a of the stator core 110, the leg end 119b is also arranged at the outermost layer in the radial direction (also referring to the leg end at the outermost slot-position layer in FIG. 9). The wire configuration also includes a plurality of leg ends 114c of the second U-shaped wires 114 and a plurality of leg ends 116b of the first straight wires 116. The two leg ends 114c of the second U-shaped wires 114 are connected to corresponding immediately-adjacent first leg ends 116b of the first straight wires 116 respectively.

Figure 18:
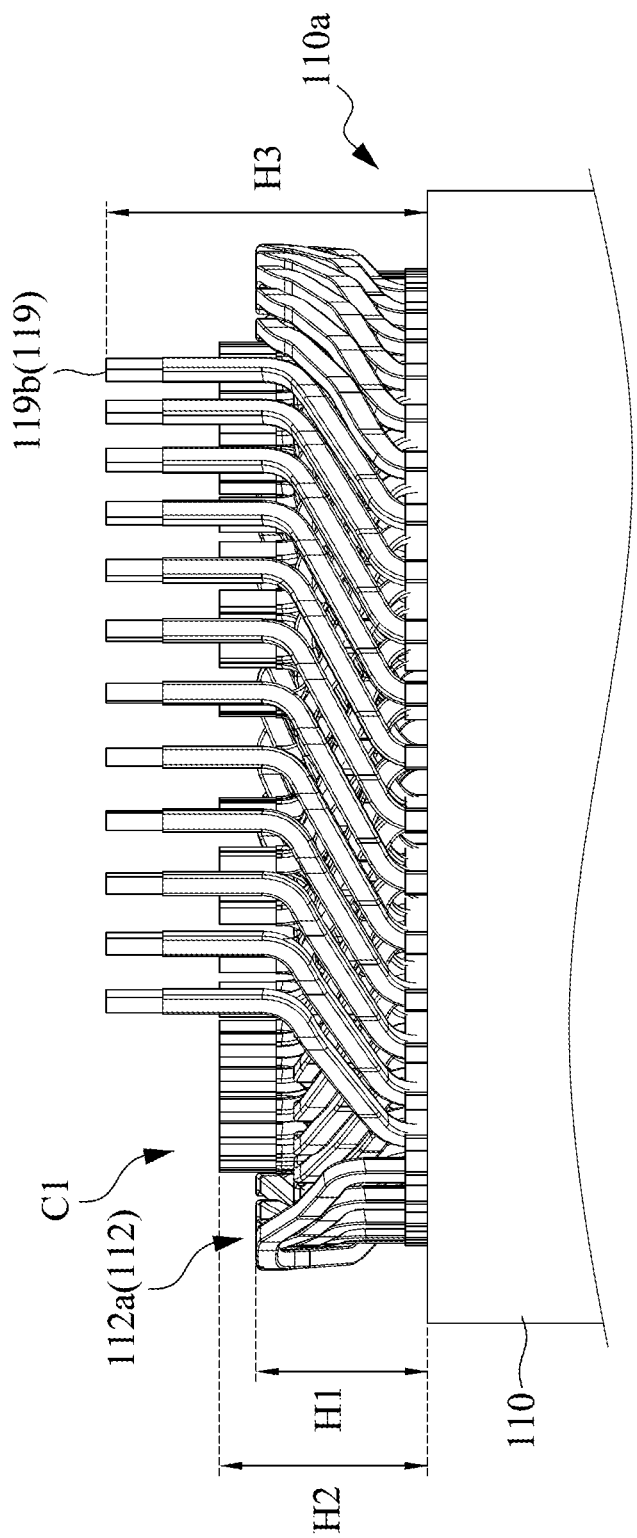
FIG. 18 illustrates a side view of the wire configuration at a first side of a motor stator in FIG. 17.

Reference is made to FIG. 18, which illustrates a side view of the wire configuration at the first side 110a of a motor stator in FIG. 17. The two leg ends 114c of the second U-shaped wire 114 are flush with the first leg end 116b of the corresponding immediately adjacent first straight wire 116 in tops of all end connections C1, and an axial height H2 protruding from the stator core 110 which is greater than an axial height H1 of the U-shaped section 112a of the first U-shaped wire 112 protruding from the stator core 110 (i.e., H2>H1), so that welding the leg ends (114c, 116b) is not affected by the U-shaped sections 112a. In addition, tops of the leg ends 119b of the second straight wires 119 are flush with one another, and its axial height H3 protruding from the stator core 110 which is greater than the axial height H1 of the U-shaped section 112a protruding from the stator core 110, and also higher than the height H2 (i.e., H3>H2>H1), thereby facilitating the leg ends 119b of the second straight wires 119 to be connected to the corresponding phase terminals or neutral terminals.

Figure 19:
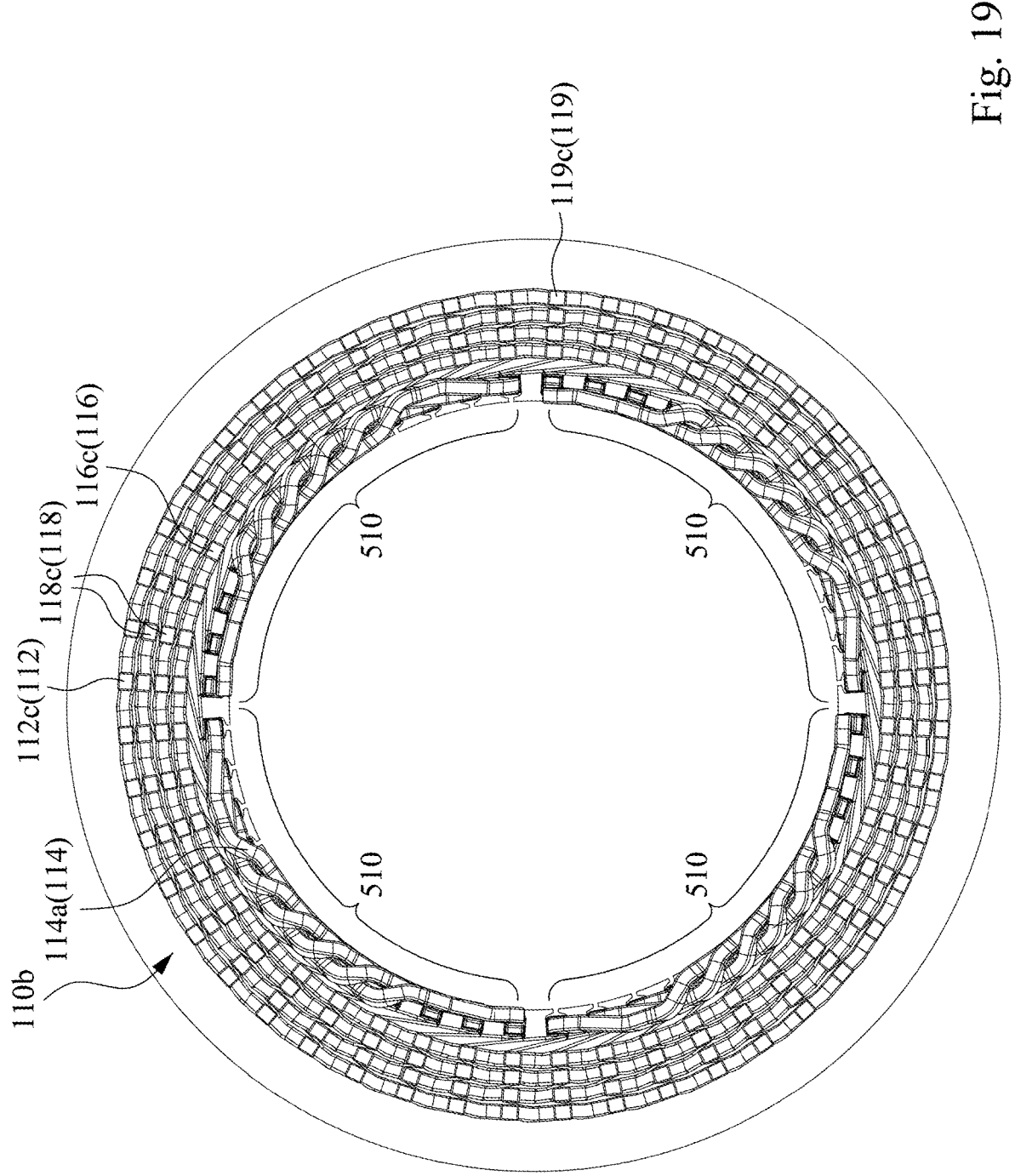
FIG. 19 illustrates a perspective view of a wire configuration at a second side of a motor stator according to an embodiment of the present disclosure.

Reference is made to FIG. 19, which illustrates a perspective view of a wire configuration at a second side 110b of a motor stator according to an embodiment of the present disclosure. The wire configuration includes a plurality of second U-shaped wires 114, and each second U-shaped wire 114 includes two leg sections 114b (referring to FIG. 13) that are arranged in the innermost slot-position layer (L5) in the radial direction. Therefore, when the U-shaped section 114a protrudes from the second side 110b of the stator core 110, it is also located on the innermost layer L5 in the radial direction, and the two leg sections 114b are separated by a span across the slots in the circumferential direction by a pole pitch (referring to the U-shaped section at the innermost slot-position layer in FIG. 10). The second U-shaped wires 114 include four second U-shaped wire groups 510, which are arranged with equal spans across the slot-positions in the circumferential direction, and each second U-shaped wire group 510 includes 6 partially-overlapped U-shaped sections 114a of the U-shaped wires 114. Each second U-shaped wire group 510 has an equal span of two pole pitches (the motor stator includes 8 pole regions, and 8 pole regions are equally divided by 4 second U-shaped wire groups 510, such that each second U-shaped wire group 510 has the equal span of two pole pitches). The wire configuration further includes a plurality of leg ends 112c of the first U-shaped wires 112, a plurality of leg ends 118c of the third U-shaped wires 118, and a plurality of leg ends 116c of the first straight wires 116. The middle straight section 116a (referring to FIG. 15) of each first straight wire 116 is located in the second radially-inner slot-position layer (L4) in the radial direction. The two leg ends 112c of the first U-shaped wire 112 are respectively connected to corresponding immediately adjacent one of the two leg ends 118c of the third U-shaped wire 118 on the second side 110b of the stator core 110. The leg end 116c of the first straight wire 116 is connected to corresponding immediately adjacent one of the two leg ends 118c of the third U-shaped wire 118 on the second side 110b of the stator core 110.

Figure 20:
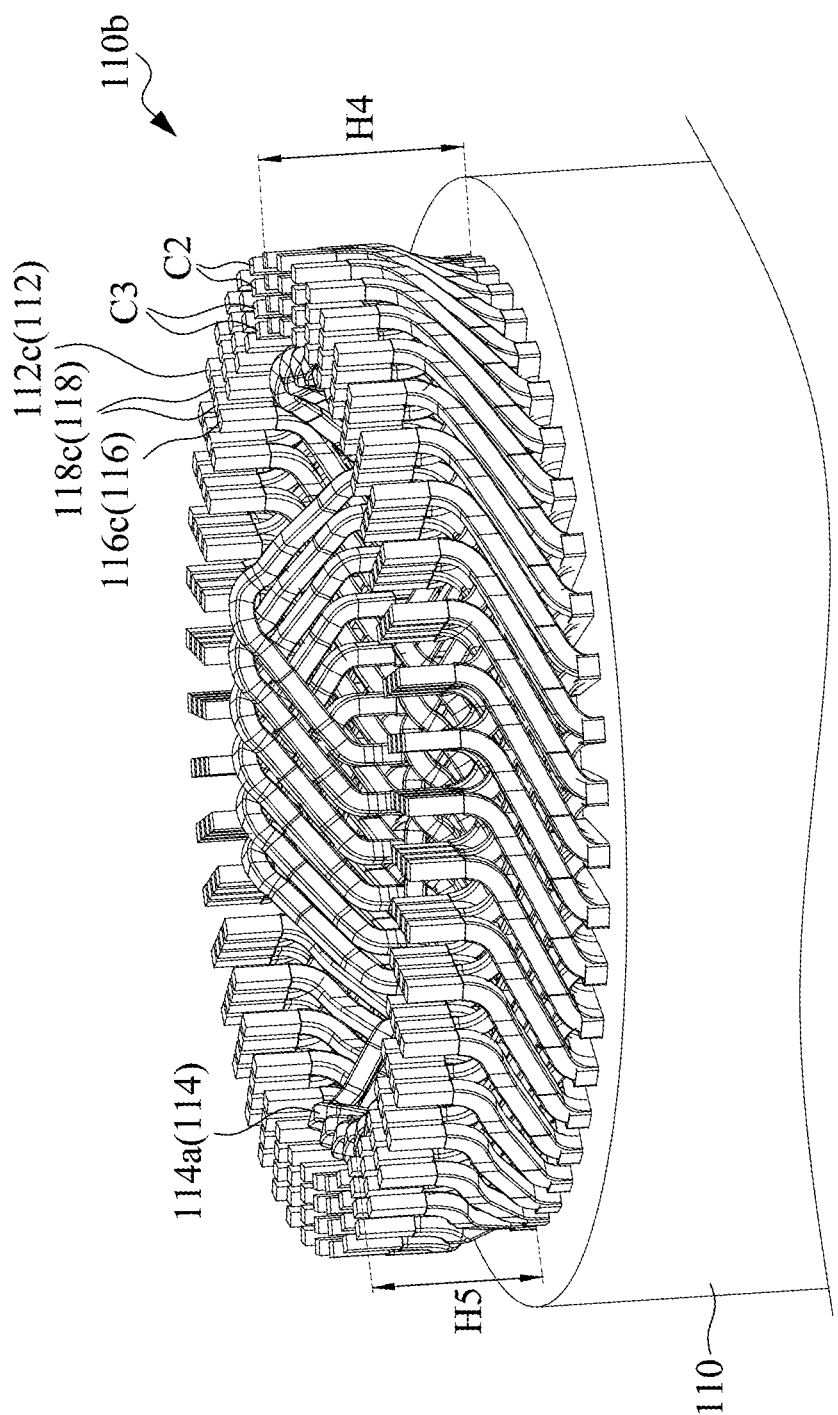
FIG. 20 illustrates a side view of the wire configuration at a second side of a motor stator in FIG. 19.

Reference is made to FIG. 20, which illustrates a side view of the wire configuration at the second side 100b of a motor stator in FIG. 19. The two leg ends 112c of the first U-shaped wire 112 and the two leg ends 118c of the third U-shaped wire 118 are flush with each other in tops of all end connections C2, and its axial height H4 protrudes from the stator core 110 which is greater than an axial height H5 of the U-shaped section 114a of the second U-shaped wire 114 protruding from the stator core 110 (H4>H5), so that welding the leg ends (112c, 118c) is not affected by the U-shaped sections 114a. The second leg end 116c of the first straight wire 116 and corresponding immediately adjacent one of the two leg ends 118c of the third U-shaped wire 118 are flush with each other in tops of all end connections C3, and its axial height H4 protrudes from the stator core 110 which is greater than axial height H5 of the U-shaped section 114a of the second U-shaped wire 114 protruding from the stator core 110 (H4>H5), so that welding the leg ends (116c, 118c) is not affected by the U-shaped sections 114a. In addition, the tops of all end connections C2 are also flush with the tops of all end connections C3 to speed up the welding of the leg ends (112c, 116c, 118c).

Although three types of U-shaped wires and two types of straight wires are only exemplified on the motor stator core with 48-slots and 5-slot-position layers, they can also be applied to a stator core with other odd-numbered slot-position layers greater than or equal to 5 and the number of slots and is not limited.

The hairpin wire motor stator disclosed herein utilizeds various types of U-shaped wires and various types of straight wires that are appropriately arranged on the motor stator core of an odd-numbered slot-position layers greater than or equal to 5 such that the wire span can be easily adjusted on two opposites sides of the stator core, thereby reducing the difficulty of welding and bonding as well as associated man-hours and costs for bonding and manufacturing.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A hairpin wire motor stator comprising:
   a ring-shaped stator core defining a rotor accommodation space at a center of the stator core, wherein the stator core comprises a first side and a second side opposite to the first side;
   a plurality of slot-positions disposed on the stator core and surrounding the rotor accommodation space circumferentially, the slot-positions forming M radially-adjacent slot-position layers, wherein M is an odd number greater than or equal to 5; and
   a plurality of hairpin wires configured to be disposed into the slot-positions and connected to form windings, wherein the hairpin wires comprise:
      a plurality of first U-shaped wires each comprising two leg sections disposed at a radially-outmost one of the slot-position layers;
      a plurality of second U-shaped wires each comprising two leg sections disposed at a radially-innermost one of the slot-position layers;
      a plurality of third U-shaped wires each comprising two leg sections disposed at immediately-adjacent two of the slot-position layers between the radially-outmost one and the radially-innermost one of the slot-position layers;
      a plurality of first straight wires each comprising a middle straight section disposed at a second radially-inner one of the slot-position layers; and
      a plurality of second straight wires each comprising a middle straight section disposed at the radially-outmost one of the slot-position layers.

2. The hairpin wire motor stator of claim 1, wherein each first U-shaped wire includes a U-shaped section protruding from the first side of the stator core and two leg ends protruding from the second side of the stator core,
   wherein each second U-shaped wire includes a U-shaped section protruding from the second side of the stator core and two leg ends protruding from the first side of the stator core, and
   wherein each third U-shaped wire includes a U-shaped section protruding from the first side of the stator core and two leg ends protruding from the second side of the stator core.

3. The hairpin wire motor stator of claim 1, wherein each first straight wire includes a first leg end protruding from the first side of the stator core and a second leg end protruding from the second side of the stator core, and
   wherein each second straight wire includes a first leg end protruding from the first side of the stator core and a second leg end protruding from the second side of the stator core.

4. The hairpin wire motor stator of claim 3, wherein the first leg end of the second straight wire is connected to a phase terminal or a neutral terminal, and
   wherein the two leg ends of the second U-shaped wire are connected with immediately-adjacent ones of the first leg ends of the first straight wires respectively.

5. The hairpin wire motor stator of claim 3, wherein the two leg ends of the first U-shaped wire are connected with immediately-adjacent ones of the two leg ends of the third U-shaped wires respectively, and
   wherein the second leg end of the first straight wire is connected with immediately-adjacent ones of the two leg ends of the third U-shaped wires respectively.

6. The hairpin wire motor stator of claim 1, wherein the stator core includes a plurality of pole regions surrounding the stator core circumferentially, each pole region includes a plurality of the slot-positions, the two leg sections of the first U-shaped wire are spaced apart by a pole pitch across the slot-positions circumferentially, and the two leg sections of the second U-shaped wire are spaced apart by a pole pitch across the slot-positions circumferentially.

7. The hairpin wire motor stator of claim 1, wherein the first U-shaped wires include a plurality of first U-shaped wire groups configured to be disposed into corresponding ones of the slot-positions circumferentially, wherein each first U-shaped wire group includes partially-overlapped ones of the first U-shaped wires.

8. The hairpin wire motor stator of claim 7, wherein the second U-shaped wires include a plurality of second U-shaped wire groups configured to be disposed into corresponding ones of the slot-positions circumferentially, wherein each second U-shaped wire group includes partially-overlapped ones of the second U-shaped wires.

9. The hairpin wire motor stator of claim 4, wherein an end connection of the two leg ends of the second U-shaped wire and the corresponding immediately adjacent first leg end of the first straight wire has an axial height protruding from the stator core which is greater than an axial height of the U-shaped section of the first U-shaped wire protruding from the stator core.

10. The hairpin wire motor stator of claim 4, wherein the first leg end of the second straight wire has an axial height protruding from the stator core which is greater than an axial height of the U-shaped section of the first U-shaped wire protruding from the stator core.

11. The hairpin wire motor stator of claim 5, wherein an end connection of one of the two leg ends of the first U-shaped wire and corresponding immediately adjacent one of the two leg ends of the third U-shaped wire has an axial height protruding from the stator core which is greater than an axial height of the U-shaped section of the second U-shaped wire protruding from the stator core.

12. The hairpin wire motor stator of claim 5, wherein an end connection of the second leg end of the first straight wire and corresponding immediately adjacent one of the two leg ends of the third U-shaped wire has an axial height protruding from the stator core which is greater than an axial height of the U-shaped section of the second U-shaped wire protruding from the stator core.

13. A hairpin wire motor stator comprising:
a stator core comprising a first side and a second side opposite to the first side;
a plurality of slot-positions disposed on the stator core circumferentially to form M radially-adjacent slot-position layers, wherein M is an odd number greater than or equal to 5; and
a plurality of hairpin wires configured to be disposed into the slot-positions and connected to form windings, the hairpin wires comprising first U-shaped wires disposed at a radially-outmost one of the slot-position layers and second U-shaped wires disposed at a radially-innermost one of the slot-position layers, wherein each first U-shaped wire includes a U-shaped section protruding from the first side of the stator core and disposed at the radially-outmost one of the slot-position layers, each second U-shaped wire includes a U-shaped section protruding from the second side of the stator core and disposed at the radially-innermost one of the slot-position layers.

14. The hairpin wire motor stator of claim 13, wherein the plurality of hairpin wires further comprises third U-shaped wires, each third U-shaped wire includes a U-shaped section protruding from the first side of the stator core and disposed at immediately-adjacent two of the slot-position layers between the radially-outmost one and the radially-innermost one of the slot-position layers.

15. The hairpin wire motor stator of claim 14, wherein the plurality of hairpin wires further comprises first straight wires disposed at a second radially-inner one of the slot-position layers and second straight wires disposed at the radially-outmost one of the slot-position layers,
wherein the first straight wire is connected between the second U-shaped wire and the third U-shaped wire, and
wherein the second straight wire is connected between a phase terminal or a neutral terminal and the third U-shaped wire.

16. The hairpin wire motor stator of claim 15, wherein the first straight wire protrudes from the first side of the stator core to connect the second U-shaped wire and protrudes from the second side of the stator core to connect the third U-shaped wire, and
wherein the second straight wire protrudes from the first side of the stator core to connect the phase terminal or the neutral terminal and protrudes from the second side of the stator core to connect the third U-shaped wire.

17. The hairpin wire motor stator of claim 13, wherein the stator core includes a plurality of pole regions surrounding the stator core circumferentially, each pole region includes a plurality of the slot-positions, the U-shaped section of the first U-shaped wire has a span of a pole pitch across the slot-positions circumferentially, and the U-shaped section of the second U-shaped wire has a span of a pole pitch across the slot-positions circumferentially.

18. The hairpin wire motor stator of claim 13, wherein the first U-shaped wires include a plurality of first U-shaped wire groups configured to be disposed into corresponding ones of the slot-positions circumferentially, wherein each first U-shaped wire group includes partially-overlapped U-shaped sections of the first U-shaped wires.

19. The hairpin wire motor stator of claim 18, wherein the second U-shaped wires include a plurality of second U-shaped wire groups configured to be disposed into corresponding ones of the slot-positions circumferentially, wherein each second U-shaped wire group includes partially-overlapped U-shaped sections of the second U-shaped wires.

20. The hairpin wire motor stator of claim 19, wherein the stator core includes a plurality of pole regions surrounding the stator core circumferentially, each pole region includes a plurality of the slot-positions, the second U-shaped wire groups are disposed with equal spans into corresponding ones of the slot-positions circumferentially, each span is two pole pitches.

* * * * *